(12) United States Patent
Sakikawa et al.

(10) Patent No.: US 11,007,475 B2
(45) Date of Patent: May 18, 2021

(54) DEHUMIDIFICATION DEVICE AND DEHUMIDIFICATION METHOD

(71) Applicants: SHARP KABUSHIKI KAISHA, Sakai (JP); THE SCHOOL CORPORATION KANSAI UNIVERSITY, Suita (JP)

(72) Inventors: Nobuki Sakikawa, Sakai (JP); Takashi Miyata, Suita (JP); Kazuya Matsumoto, Suita (JP)

(73) Assignees: SHARP KABUSHIKI KAISHA, Sakai (JP); THE SCHOOL CORPORATION KANSAI UNIVERSITY, Suita (JP)

( * ) Notice: Subject to any disclaimer, the term of this patent is extended or adjusted under 35 U.S.C. 154(b) by 224 days.

(21) Appl. No.: 15/552,235

(22) PCT Filed: Feb. 16, 2016

(86) PCT No.: PCT/JP2016/054477
§ 371 (c)(1),
(2) Date: Aug. 18, 2017

(87) PCT Pub. No.: WO2016/194407
PCT Pub. Date: Dec. 8, 2016

(65) Prior Publication Data
US 2018/0071676 A1    Mar. 15, 2018

(30) Foreign Application Priority Data
May 29, 2015    (JP) .............................. JP2015-109253

(51) Int. Cl.
*B01D 53/26*    (2006.01)
*B01D 53/28*    (2006.01)
(Continued)

(52) U.S. Cl.
CPC .......... *B01D 53/261* (2013.01); *B01D 53/06* (2013.01); *B01D 53/26* (2013.01); *B01D 53/28* (2013.01);
(Continued)

(58) Field of Classification Search
CPC ... F24F 2003/144; B01J 20/267; B01D 53/28; B01D 2253/202
(Continued)

(56) References Cited

U.S. PATENT DOCUMENTS

2012/0204725 A1* 8/2012 Goelet .................... B01D 5/00
96/143

FOREIGN PATENT DOCUMENTS

CN    102908881 A    2/2013
CN    106061581 A    10/2016
(Continued)

*Primary Examiner* — Thuan D Dang
(74) *Attorney, Agent, or Firm* — ScienBiziP, P.C.

(57) ABSTRACT

To provide a dehumidifying device and dehumidifying method each of which allows absorbed water to be efficiently extracted from a stimuli-responsive polymeric moisture absorbing material or a polymeric moisture absorbing material containing a stimuli-responsive polymeric moisture absorbing material, a dehumidifying device of an embodiment of the present invention includes (i) a stimulus providing section configured to provide an external stimulus to a stimuli-responsive polymeric moisture absorbing material or a polymeric moisture absorbing material containing a stimuli-responsive polymeric moisture absorbing material and (ii) a transfer section configured to transfer water released by the polymeric moisture absorbing material.

6 Claims, 23 Drawing Sheets

(51) Int. Cl.
  *F24F 3/14* (2006.01)
  *B01D 53/06* (2006.01)
  *B01J 20/26* (2006.01)
  *B01J 20/34* (2006.01)

(52) U.S. Cl.
  CPC ........... *B01J 20/261* (2013.01); *B01J 20/267* (2013.01); *B01J 20/3425* (2013.01); *F24F 3/14* (2013.01); *F24F 3/1423* (2013.01); *B01D 2253/202* (2013.01); *B01D 2257/80* (2013.01); *B01D 2259/40088* (2013.01); *F24F 2003/144* (2013.01)

(58) Field of Classification Search
  USPC .................................. 96/143, 109, 112, 113
  See application file for complete search history.

(56) References Cited

FOREIGN PATENT DOCUMENTS

| | | | |
|---|---|---|---|
| JP | 2001-259349 A | | 9/2001 |
| JP | 2002-310485 A | | 10/2002 |
| JP | 2003-144833 A | | 5/2003 |
| JP | 2005-34838 A | | 2/2005 |
| WO | WO-2007/026023 | * | 8/2007 |

* cited by examiner

DEHUMIDIFICATION DEVICE AND DEHUMIDIFICATION METHOD

TECHNICAL FIELD

The present invention relates to a dehumidifying device and dehumidifying method each involving use of a polymeric moisture absorbing material.

BACKGROUND ART

Dehumidifying devices and humidity control devices are typified by two types: a refrigeration cycle system and a moisture absorbent system. The refrigeration cycle system includes a compressor, and is a system in which indoor air is dehumidified by causing moisture in the air to condense through cooling of the indoor air with use of an evaporator (see, for example, Patent Literature 1). The moisture absorbent system uses a rotor obtained by processing a moisture absorbing porous material such as a moisture absorbent into the form a rotor. Specifically, in the moisture absorbent system, (i) the rotor is made to absorb moisture in indoor air, (ii) the rotor, which has thus absorbed the moisture, is exposed to hot air generated by an electric heater, so that the moisture in the rotor is extracted as high-temperature, high-humidity air, and (iii) the high-temperature, high-humidity air is cooled with use of indoor air, so that the moisture in the high-temperature, high-humidity air is condensed and the indoor air is dehumidified as a result (see, for example, Patent Literatures 2 and 3). Furthermore, a system in which the respective characteristics of both systems are combined is also used (see, for example, Patent Literature 4).

Unfortunately, however, the refrigeration cycle system, for example, uses a halogen-based gas leading to environmental destruction, often includes a large-sized dehumidifying device or humidity control device as a result of mounting a compressor, and/or causes loud noise. Further, the moisture absorbent system requires regenerative heat having a temperature of not lower than 200° C., and is inefficient.

The above two systems can be combined to provide a hybrid type, which involves improvements in, for example, using part of heat of compression from a compressor for regeneration of a moisture absorbent rotor and which allows the moisture absorbent system to be used more widely. The hybrid type, however, requires a complex air pathway and/or mechanism, and is inevitably large-sized. Further, the hybrid type is not different from the above two systems in that it also collects water vapor by, for example, adsorption and condenses the water vapor by supersaturated cooling.

CITATION LIST

Patent Literature

[Patent Literature 1]
Japanese Patent Application Publication Tokukai No. 2002-310485 (Publication date: Oct. 23, 2002)
[Patent Literature 2]
Japanese Patent Application Publication Tokukai No. 2001-259349 (Publication date: Sep. 25, 2001)
[Patent Literature 3]
Japanese Patent Application Publication Tokukai No. 2003-144833 (Publication date: May 20, 2003)
[Patent Literature 4]
Japanese Patent Application Publication Tokukai No. 2005-34838 (Publication date: Feb. 10, 2005)

SUMMARY OF INVENTION

Technical Problem

In a case where a dehumidifier that uses a moisture absorbent uses as a moisture absorbent a polymeric moisture absorbing material containing a stimuli-responsive polymer, an external stimulus allows absorbed moisture to be extracted. It is, however, difficult to efficiently extract water from a moisture absorbing material that has absorbed atmospheric water.

The present invention has been accomplished in view of the above issue. It is an object of the present invention to provide a dehumidifying device and dehumidifying method each of which allows absorbed water to be efficiently extracted from a polymeric moisture absorbing material containing a stimuli-responsive polymer.

Solution to Problem

In order to attain the above object, a dehumidifying device in accordance with an embodiment of the present invention includes: a polymeric moisture absorbing material containing a stimuli-responsive polymer; a stimulus providing section configured to provide an external stimulus to the polymeric moisture absorbing material; and a transfer section configured to come into contact with the polymeric moisture absorbing material.

A dehumidifying device in accordance with an embodiment of the present invention may include, as a transfer section configured to transfer water released by the polymeric moisture absorbing material, a transfer section including a material that does not absorb water.

A dehumidifying device in accordance with an embodiment of the present invention may be configured such that the transfer section includes a material that does not absorb water.

A dehumidifying device in accordance with an embodiment of the present invention may be configured such that the transfer section includes a material that absorbs water.

A dehumidifying device in accordance with an embodiment of the present invention may preferably further include a water droplet removing section configured to come into contact with the transfer section.

A dehumidifying device in accordance with an embodiment of the present invention may be configured such that the polymeric moisture absorbing material is disposed on a disk-shaped base material for formation of a moisture absorbing unit; and the transfer section is positioned so as to face a portion of the moisture absorbing unit to which portion the stimulus providing section provides the external stimulus.

A dehumidifying device in accordance with an embodiment of the present invention may be configured such that the polymeric moisture absorbing material is disposed on a side surface of a cylindrical base material for formation of a moisture absorbing unit; and the transfer section is in a cylindrical shape and is disposed at such a position as to have a side surface in contact with a portion of the moisture absorbing unit to which portion the stimulus providing section provides the external stimulus.

In order to attain the above object, a dehumidifying method in accordance with an embodiment of the present invention includes: causing a polymeric moisture absorbing material containing a stimuli-responsive polymer to absorb atmospheric water; providing an external stimulus to the polymeric moisture absorbing material so as to decrease affinity of the polymeric moisture absorbing material with water; and bringing a transfer section into contact with a surface of the polymeric moisture absorbing material, whose affinity with water has been decreased.

Advantageous Effects of Invention

The above configuration causes water absorbed by a polymeric moisture absorbing material containing a stimuli-responsive polymer to be transferred onto a transfer section and then causes such water to drop down into a water drain tank to be collected. The above configuration, therefore, makes it possible to provide a dehumidifying device and dehumidifying method each of which efficiently collects water released by a polymeric moisture absorbing material.

DESCRIPTION OF EMBODIMENTS

Embodiment 1

Figure 1:
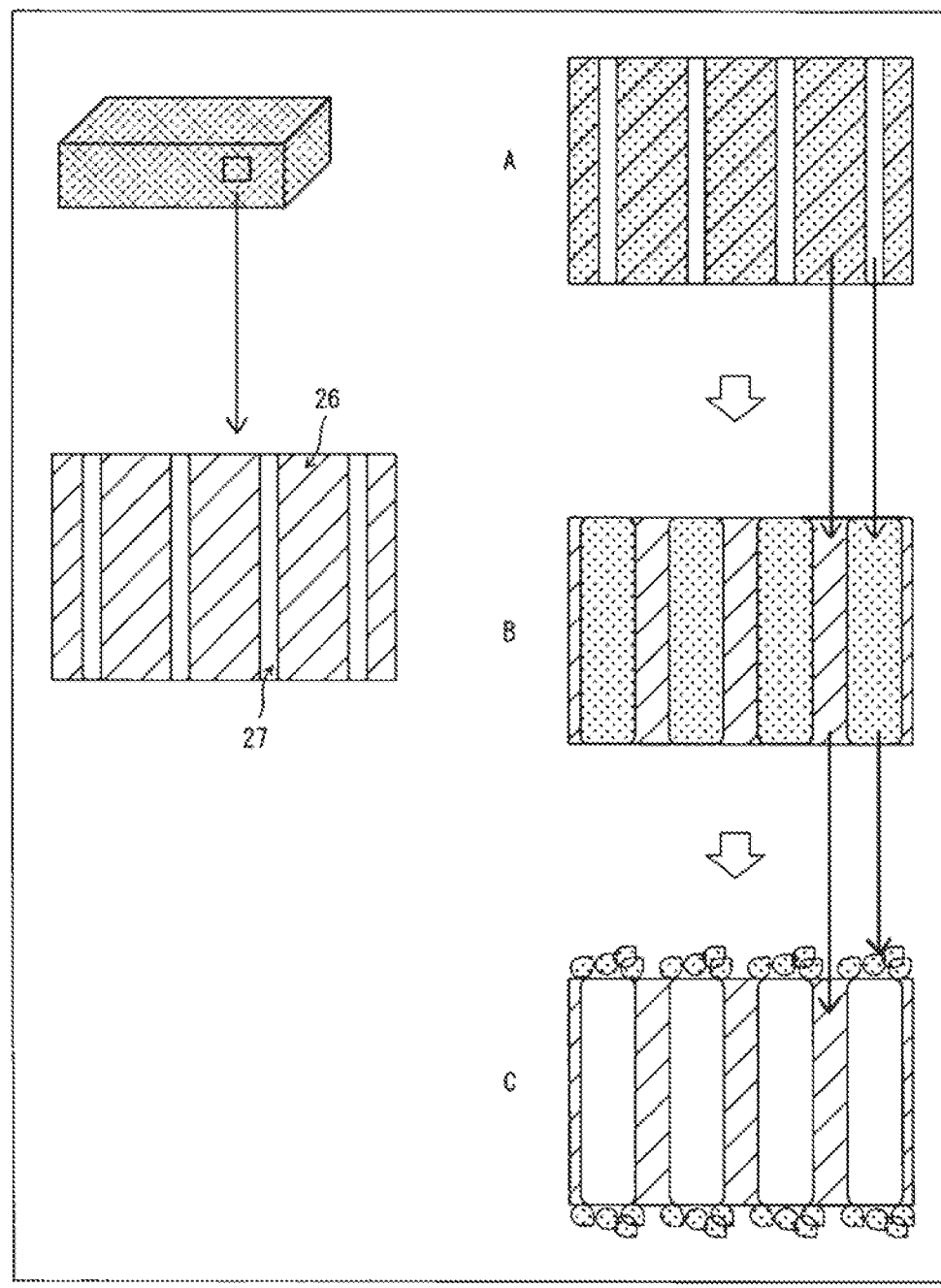
FIG. 1 shows diagrams conceptually illustrating how atmospheric water (water vapor) is absorbed and released in accordance with embodiments of the present invention each of which embodiments use a porous, polymeric moisture absorbing material containing a stimuli-responsive polymer.
Figure 2:
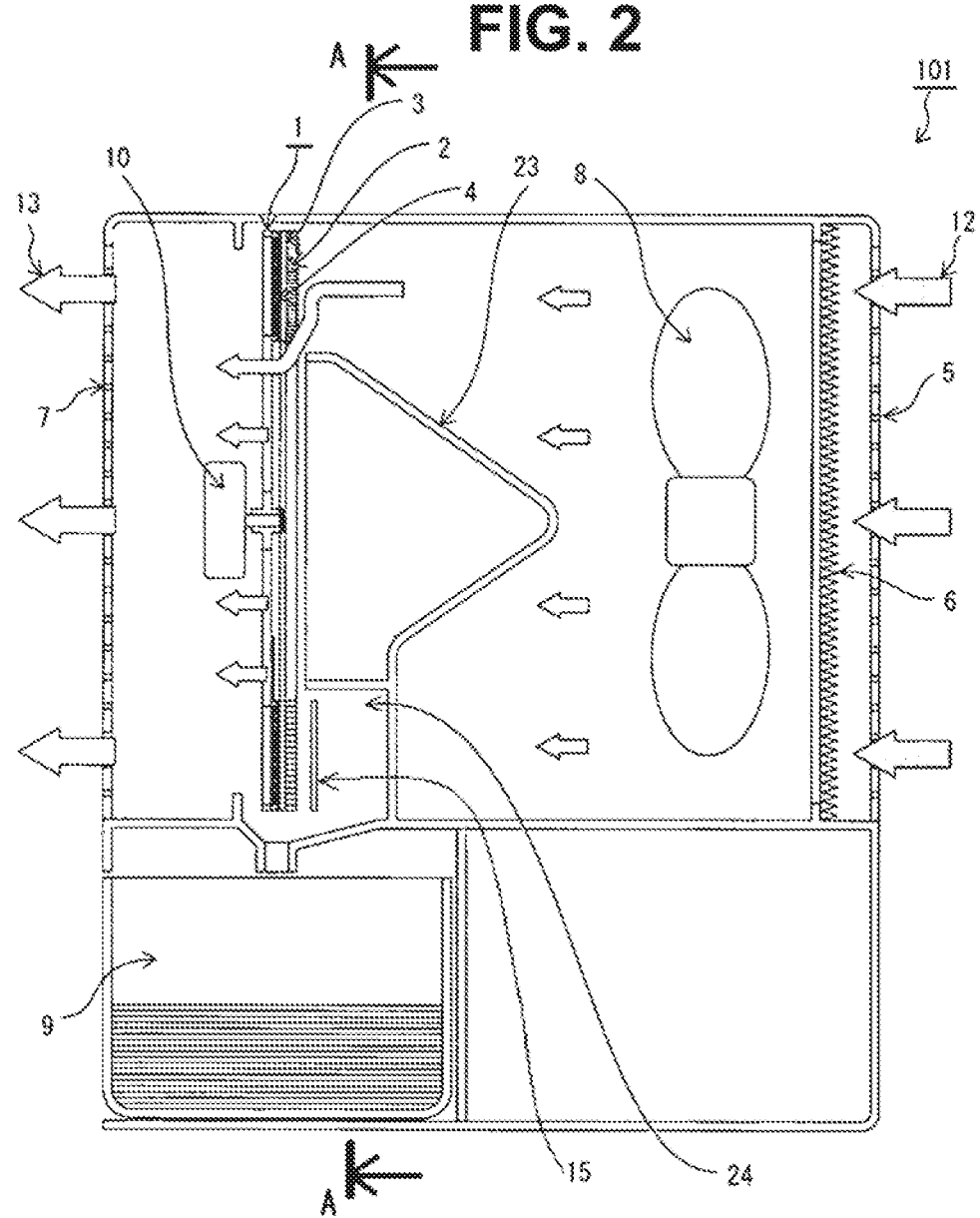
FIG. 2 is a longitudinal cross-sectional view of a dehumidifying device in accordance with Embodiment 1 of the present invention.
Figure 3:
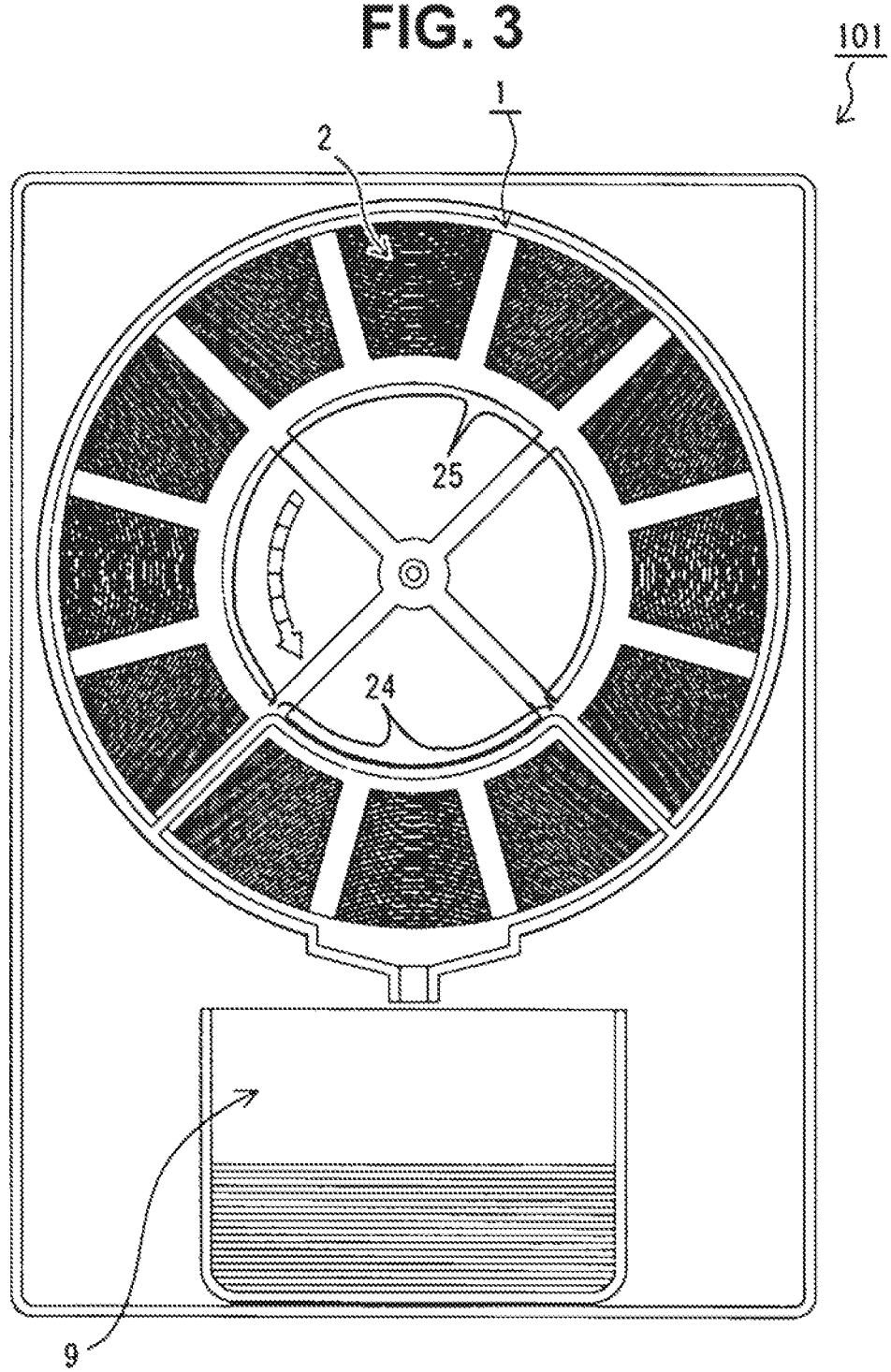
FIG. 3 is a cross-sectional view of the dehumidifying device taken along line A-A in FIG. 2.

The following description will discuss an embodiment of the present invention. FIG. 1 shows diagrams conceptually illustrating how atmospheric water, that is, water vapor, is absorbed and released in accordance with embodiments of the present invention each of which embodiments uses a polymeric moisture absorbing material containing a stimuli-responsive polymer. FIG. 2 is a longitudinal cross-sectional lateral view of a dehumidifying device 101 in accordance with Embodiment 1 of the present invention. FIG. 3 is a cross-sectional view of the dehumidifying device 101 in the direction indicated with the arrows in FIG. 2, the view being taken along line A-A in FIG. 2.

The dehumidifying device 101 includes a housing in the shape of a rectangular parallelepiped. The housing has (i) an air inlet 5 in a side surface of an upper portion thereof, (ii) an air outlet 7 in a side surface of the upper portion which side surface is opposite to the above side surface, and (iii) a tank containing section positioned at a lower portion of the housing on the side of the air outlet 7 and configured to contain a water drain tank 9. The dehumidifying device 101 contains an inlet air filter 6 positioned more inward than the air inlet 5.

The dehumidifying device 101 further contains an airflow restriction wall 23 between the air inlet 5 and the air outlet 7. Air that has taken in through the air inlet 5 flows through a space restricted by the airflow restriction wall 23 (see the arrows in FIG. 1). Air flows along a path on which are provided the air inlet 5, the inlet air filter 6, an air blowing fan 8, a moisture absorbing unit 1, and the air outlet 7 in this order from the side of the entry of air.

The moisture absorbing unit 1 is a collection of elements each including (i) a base material 3, (ii) a polymeric moisture absorbing material 2 containing a stimuli-responsive polymer and disposed on the base material 3, and (iii) a heater 4 having the shape of a flat plate and disposed on the base material 3. Each element, more specifically, includes (i) a base material 3 in the shape of a quadrangular plate, (ii) a polymeric moisture absorbing material 2 containing a stimuli-responsive polymer and disposed on a surface of the base material 3, and (iii) a plate-shaped heater 4 provided in contact with another surface of the base material 3. Such elements are arranged radially on and fixed to a disk-shaped mount in such a manner as to be rotatably supported.

FIG. 3 is a cross-sectional view of the dehumidifying device 101 taken along a line that would allow the respective surfaces of individual polymeric moisture absorbing materials 2 to be seen. As illustrated in FIGS. 2 and 3, the moisture absorbing unit 1 is on a plane parallel to that side surface of the housing of the dehumidifying device 101 in which the air inlet 5 is present and to that side surface of the housing of the dehumidifying device 101 in which the air outlet 7 is present. The moisture absorbing unit 1 includes a plurality of elements, each of which includes a polymeric moisture absorbing material 2, a base material 3, and a heater 4 arranged in this order from the side of the air inlet 5 to the side of the air outlet 7.

The individual elements of the moisture absorbing unit 1 are arranged at even intervals radially on the circumference of a circle having a center at the rotary shaft of a stepping motor 10. The elements are rotatable around the rotary shaft in the direction indicated with the arrow in FIG. 3 (counterclockwise). The moisture absorbing unit 1 is configured to be driven by the stepping motor 10, which is controlled by a control section (not shown in the drawings), to rotate. The time length of the rotation or rate of the rotation is selected appropriately in view of the moisture absorption property and water discharge property of the polymeric moisture absorbing material. The moisture absorbing unit 1 may be rotated in such a manner that a single element is moved from the moisture absorption region 25 to the release region 24 at each predetermined time interval, or may be rotated slowly and continuously so that the individual elements are sequentially moved from the moisture absorption region 25 to the release region 24.

The polymeric moisture absorbing material 2 of Embodiment 1 contains a temperature-responsive polymer, whose affinity with water changes reversibly in response to heat. The temperature-responsive polymer is a polymer having a lower critical solution temperature (hereinafter referred to also as "LCST"). A polymer having an LCST is hydrophilic at low temperatures and becomes hydrophobic at an LCST or higher. Note that "LCST" herein refers to a temperature that serves as a boundary for a case where a polymer is dissolved below which boundary the polymer is hydrophilic so as to be dissolved in water and at or above which boundary the polymer is hydrophobic so as to be insoluble in water.

The polymeric moisture absorbing material 2 is preferably a porous material, but is not necessarily a porous material. The polymeric moisture absorbing material 2 is made of (i) a polymeric moisture absorbing material containing a stimuli-responsive polymer or (ii) a stimuli-responsive polymer. Specific examples of the polymeric moisture absorbing material 2 will be described later.

As illustrated in FIG. 3, the moisture absorbing unit 1 is rotated in a region divided into (i) a moisture absorption region 25, which is positioned in an upper portion of the dehumidifying device 101, and (ii) a release region 24, which is positioned in a lower portion of the dehumidifying device 101. Each time the moisture absorbing unit 1 is rotated at the predetermined time interval, one of the individual elements moves from the moisture absorption region 25 into the release region 24, and another one of the individual elements moves from the release region 24 into the moisture absorption region 25. Embodiment 1 is configured such that three elements positioned in a lower portion of the dehumidifying device 101 are in the release region 24. The dehumidifying device 101 includes in the release region 24 (i) a heater-specific fixed electrode (not shown in the drawings) positioned so as to, for conduction of electricity to the heater 4 of the element that has last entered the release region 24, come into contact with a heater electrode of that heater 4 and (ii) another heater-specific fixed electrode (not shown in the drawings) positioned so as to, for conduction of electricity to the heater 4 of the element at the lowermost position, come into contact with a heater electrode of that heater 4.

With this configuration, when the individual elements of the moisture absorbing unit 1 have each been driven by the stepping motor 10 to rotate to reach the position of either heater-specific fixed electrode, the heater 4 of the element is supplied with electricity and turned on. Embodiment 1 is configured such that the heater 4 of the element that is next to move out of the release region 24 into the moisture absorption region 25 is not turned on and that the polymeric moisture absorbing material 2 of that element is naturally cooled.

The dehumidifying device 101 further includes in the release region 24 a transfer section 15 configured to transfer water droplets exuding from the individual elements. The transfer section 15 is caused by a control section (not shown in the drawings) to come into contact with water droplets for transfer that exude from the polymeric moisture absorbing materials 2 of the moisture absorbing unit 1.

The transfer section 15 is supported in such a manner as to be movable in the direction in which the moisture absorbing unit 1 is rotated. The transfer section 15 is controlled such that immediately before the element with which the transfer section 15 has been in contact is moved from the release region 24 to the moisture absorption region 25, the transfer section 15 comes off that element. At this stage, water droplets exuded from the polymeric moisture absorbing material 2 is transferred to a surface of the transfer section 15. Embodiment 1 is configured such that the transfer section 15 comes into contact with an element of the moisture absorbing unit 1 after water has exuded from a surface of that element. Embodiment 1 may, however, be configured differently such that the transfer section 15 comes into contact with an element immediately after that element has moved into the release region 24.

The transfer section 15 of Embodiment 1 is made of a material that does not absorb water and is in the shape of a plate. Water droplets transferred on a surface of the transfer section 15 drop therefrom by gravity. The transfer section 15 is preferably so shaped as to be capable of transferring exuded water droplets effectively in correspondence with the shape of each element. The shape of the transfer section 15 is, however, not limited to such a shape.

With the airflow restriction wall 23, air that has been taken in through the air inlet 5 passes through only the moisture absorption region 25 and is prevented from flowing through the release region 24. At the bottom of the release region 24, the dehumidifying device 101 has a drip opening, which allows collected water to be discharged into the water drain tank 9 under the drip opening.

With reference to FIGS. 1 to 7, the following description will discuss how the dehumidifying device 101 removes moisture. First, when the dehumidifying device 101 is turned on, the air blowing fan 8 inside the dehumidifying device 101 is turned on, which in turn causes air (moist air 12) to be taken into the dehumidifying device 101 through the air inlet 5 and flow through the inlet air filter 6. The moisture absorbing unit 1 is driven by the stepping motor 10 to rotate around the rotary shaft of the stepping motor 10 at predetermined time intervals or at a predetermined rate of rotation. The moisture absorbing unit 1 may be rotated in such a manner that a single element is moved from the moisture absorption region 25 to the release region 24 at each predetermined time interval, or may be rotated slowly and continuously so that the individual elements are sequentially moved from the moisture absorption region 25 to the release region 24.

The air (moist air 12) that has been taken into the dehumidifying device 101 comes into contact with polymeric moisture absorbing materials 2 of the moisture absorbing unit 1 when passing through the moisture absorption region 25. In the moisture absorption region 25, the heater 4 is not turned on. The polymeric moisture absorbing material 2, which is hydrophilic at room temperature, absorbs moisture present in the air (moist air 12). The moist air 12 is thus dehumidified when passing through the moisture absorption region 25. Then, air (dry air 13) that has been obtained by dehumidifying the moist air is discharged through the air outlet 7.

The individual elements of the moisture absorbing unit 1, which have absorbed moisture present in the air (moist air 12), are driven by the stepping motor 10 so as to sequentially move from the moisture absorption region 25 to the release region 24. In the release region 24, the heater electrode of the heater 4 of each element comes into contact with a heater-specific fixed electrode for conduction of electricity. This causes the polymeric moisture absorbing material 2 of the element to be heated by the heater 4. Further, the transfer section 15 is caused to come into contact with the polymeric moisture absorbing material 2 of the element at predetermined timing.

Since the heater 4 heats the base material 3 and heats the polymeric moisture absorbing material 2 through the base material 3, the temperature of the polymeric moisture absorbing material 2 reaches an LCST or higher, so that the polymeric moisture absorbing material 2 has a decreased affinity with water to become hydrophobic. This causes the moisture absorbed by the polymeric moisture absorbing material 2 to be released from the polymeric moisture absorbing material 2 in the form of liquid water. The water thus released from the bulk portion 26 of the polymeric moisture absorbing material 2 either remains in pores 27 in the polymeric moisture absorbing material 2 or exudes from the polymeric moisture absorbing material 2 in trace amounts. Thus, it is difficult to extract such a small amount of water released from the polymeric moisture absorbing material 2.

Figure 4:
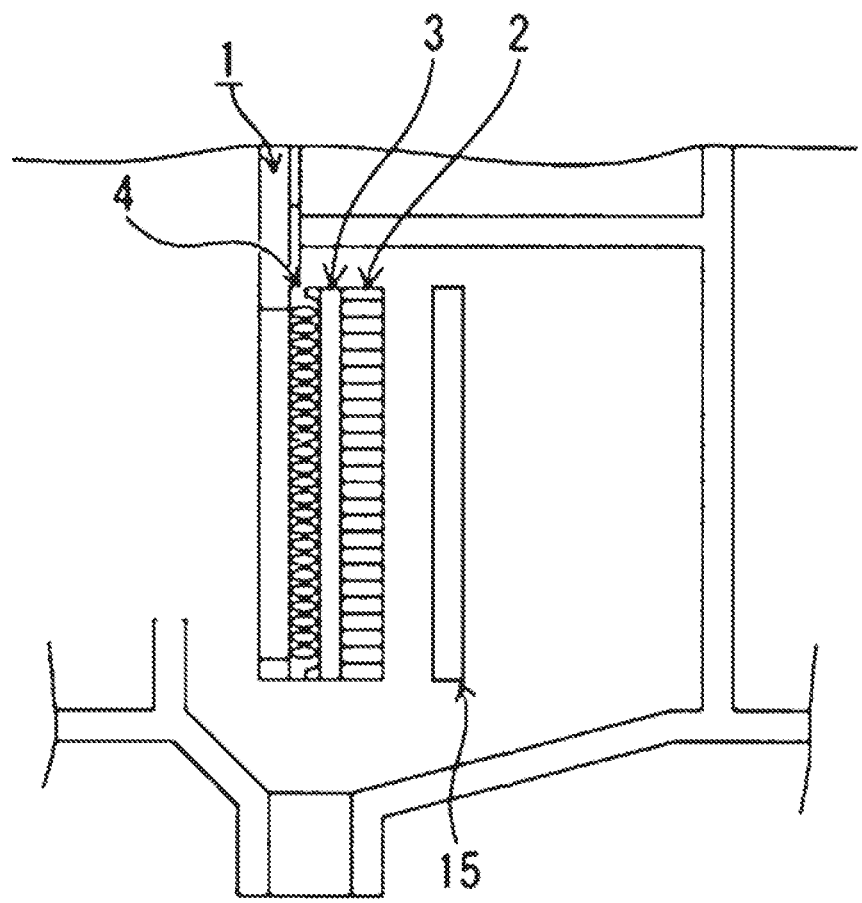
FIG. 4 is a diagram illustrating an element of a moisture absorbing unit which element has been moved into a release region as a result of rotation of the moisture absorbing unit in Embodiment 1 of the present invention.
Figure 5:
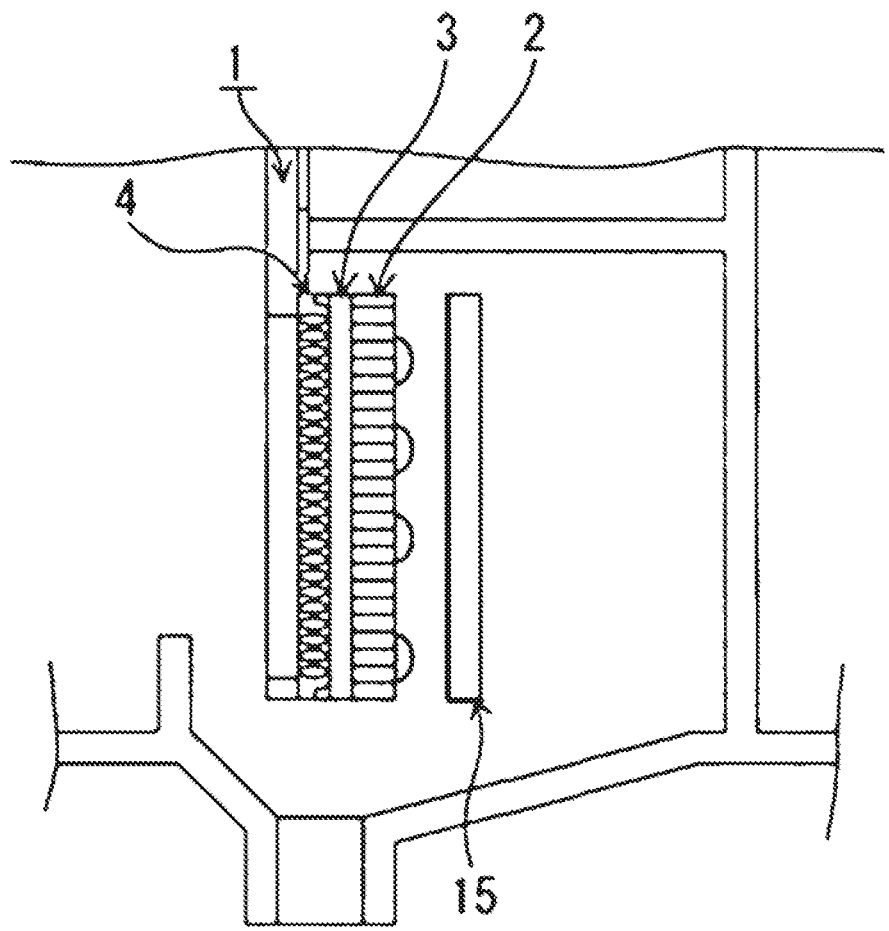
FIG. 5 is a diagram illustrating an element of a moisture absorbing unit in a state where after the element has been moved into a release region as a result of rotation of the moisture absorbing unit, water is exuding due to heating in Embodiment 1 of the present invention.

An embodiment of the present invention uses a transfer section 15 to extract the small amount of released water. FIG. 4 is a diagram illustrating an element of the moisture absorbing unit 1 in a state where (i) the element, which has absorbed moisture, has moved into the release region 24 as a result of rotation of the moisture absorbing unit 1 and (ii) the transfer section 15 has not come into contact with a surface of the moisture absorbing unit 1. At this stage, water released from the polymeric moisture absorbing material 2 has not yet been extracted to appear on a surface of the polymeric moisture absorbing material 2. FIG. 5 is a diagram illustrating an element in a state where (i) the temperature of the element has reached the LCST or higher and (ii) water droplets have thus exuded from a surface of the polymeric moisture absorbing material 2.

Figure 6:
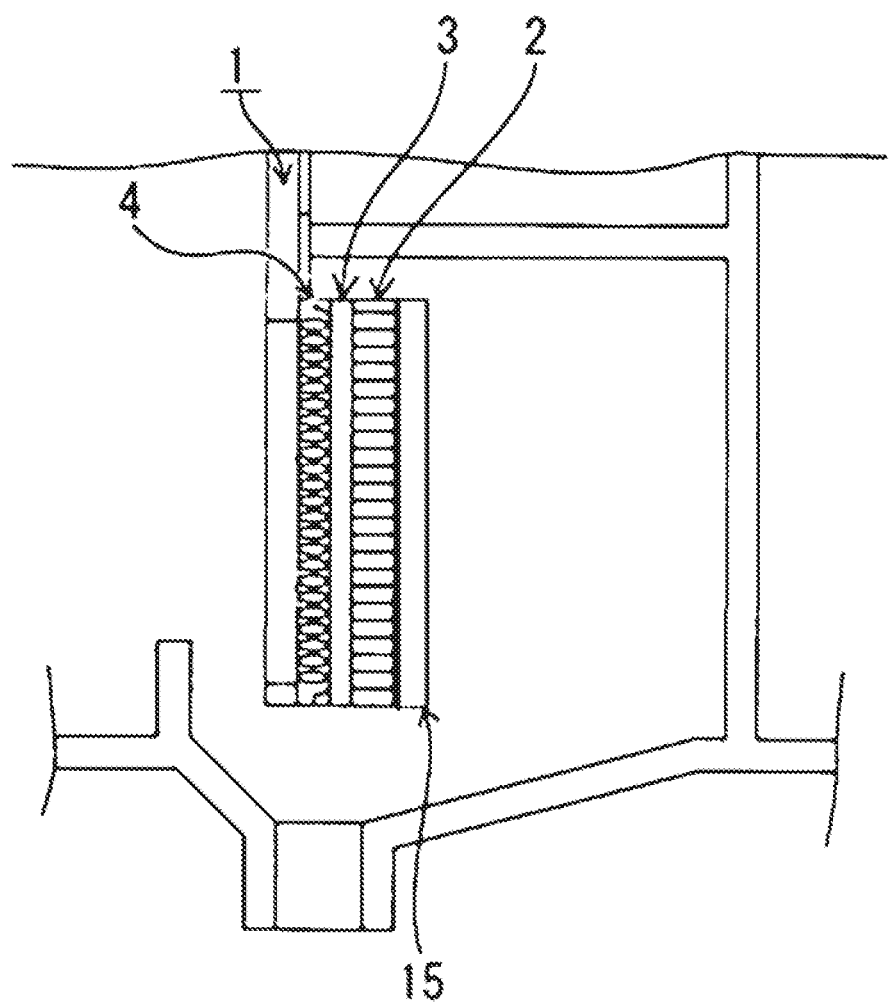
FIG. 6 is a diagram illustrating an element of a moisture absorbing unit in a state where a transfer section is in contact with a surface of the polymeric moisture absorbing material from which surface water has exuded in Embodiment 1 of the present invention.
Figure 7:
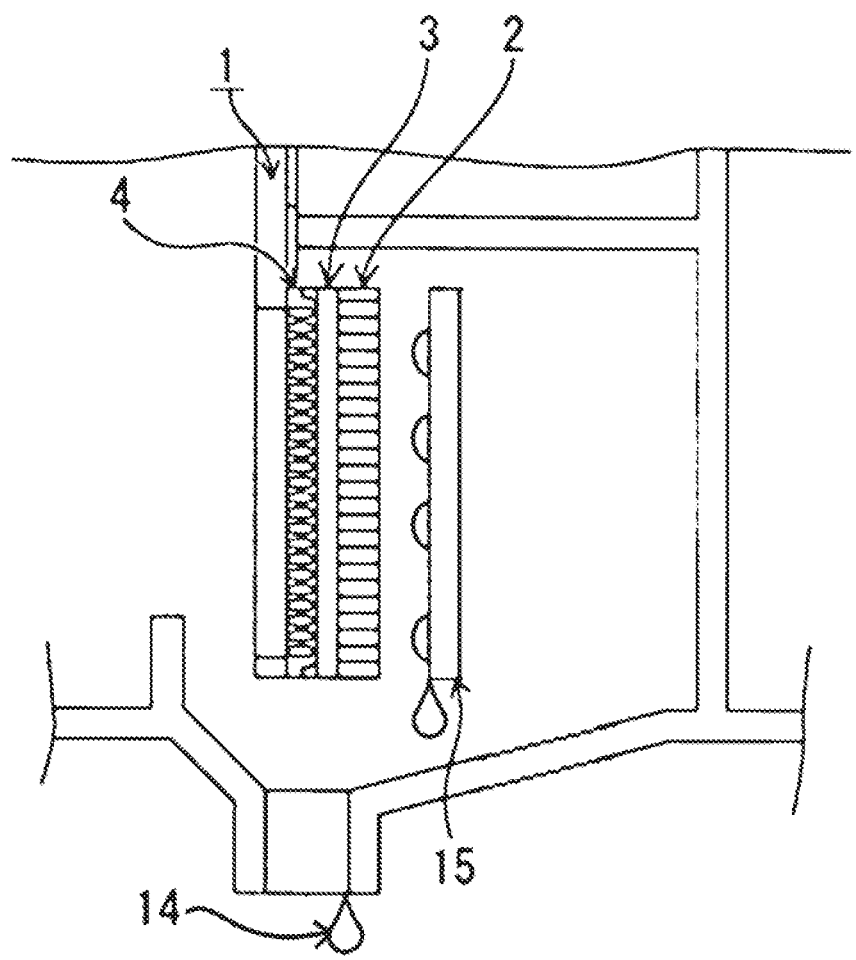
FIG. 7 is a diagram illustrating an element of a moisture absorbing unit in a state where water released by the element has been transferred on a surface of a transfer section in Embodiment 1 of the present invention.

FIG. 6 is a diagram illustrating an element of the moisture absorbing unit 1 in a state where the transfer section 15 is in contact with that element. FIG. 7 is a diagram illustrating an element of the moisture absorbing unit 1 in a state where the transfer section 15 has come off the element after a predetermined time period. Water droplets exuded from the polymeric moisture absorbing material 2 have been transferred on a surface of the transfer section 15. Water that has dropped from the surface of the transfer section 15 is discharged into the water drain tank 9 as drop water 14.

In a case where the polymeric moisture absorbing material 2 is a porous material, in particular, it is capable of absorbing a larger amount of water rapidly. It is, however, extremely difficult to recover the water thus absorbed. FIG. 1 shows diagrams schematically illustrating how atmospheric water (water vapor) is absorbed and released in a case where the polymeric moisture absorbing material 2 is a porous material. A porous, polymeric moisture absorbing material has a large number of pores 27 in a bulk portion 26 thereof.

FIG. 1 illustrates in "A" a polymeric moisture absorbing material being hydrophilic. In this state, atmospheric water is absorbed by the polymeric moisture absorbing material and present in the bulk portion 26 of the polymeric moisture absorbing material (see the dots in "A" of FIG. 1). In a case where the affinity with water of this polymeric moisture absorbing material, which has absorbed water, has been decreased in response to an external stimulus and the polymeric moisture absorbing material has become hydrophobic, the polymeric moisture absorbing material releases water (see "B" of FIG. 1). The water thus released exudes from the bulk portion 26 of the polymeric moisture absorbing material and then remains in the pores 27. Providing an external stimulus further can extract water in the pores 27 from the polymeric moisture absorbing material (see "C" of FIG. 1). An embodiment of the present invention causes a transfer section to come into contact with a surface of a porous, polymeric moisture absorbing material to (i) rapidly remove water exuded from the surface of the polymeric moisture absorbing material and (ii) allow water remaining in the bulk portion or pores to be released easily.

The polymeric moisture absorbing material 2 contains a responsive polymer having an LCST higher than room temperature, for example, a relatively low temperature that is 40° C. or higher, for example, within a range of 40° C. to 100° C., preferably within a range of 40° C. to 70° C. With this arrangement, a humidity control device including such a polymeric moisture absorbing material 2 can, without requiring supercooling or large heat quantity as with conventional humidity control devices, simply heat the polymeric moisture absorbing material to a temperature not lower than the LCST to directly extract absorbed moisture in liquid form.

Embodiment 1 is configured such that a plurality of elements each including a polymeric moisture absorbing material 2 are arranged radially and rotated. This configuration makes it possible to (i) use elements in the moisture absorption region 25 for moisture absorption and (ii) provide a stimulus to the polymeric moisture absorbing material 2 of each remaining element in the release region 24 for water extraction. That is, it is possible to simultaneously carry out moisture absorption and release.

The material for a base material 3 is not limited to any particular one as long as heat of a heater 4 can be transmitted to a polymeric moisture absorbing material 2 via the base material 3. Examples of a material suitable for the base material 3 include metals such as aluminum and stainless steel. Examples of the material for the base material 3 further include (i) resins such as polydimethylsiloxane (PDMS), polycarbonate (PC), polyolefin, and polyacrylate, (ii) silica, and (iii) ceramic.

In a case where the base material 3 is made of polydimethylsiloxane (PDMS) or the like, the base material 3 preferably has a surface coated with (i) a photothermal conversion material such as carbon black and iron oxide particles or (ii) a magnetic-thermal conversion material such as iron oxide ceramic particles and magnetite nanoparticles. This makes it possible to heat the base material 3 through, for example, light irradiation or a variable magnetic field and thereby heat the polymeric moisture absorbing material 2.

The method for disposing a polymeric moisture absorbing material 2 on a base material 3 is not limited to any particular one, and may be, for example, a method that uses a binder, a silane coupling agent, or the like.

Further, the example described above is configured such that a polymeric moisture absorbing material 2 is disposed on a surface of a plate-shaped base material 3 and that a plate-shaped heater 4 is provided in contact with another surface of the base material 3. The heater 4 may alternatively be provided on the side of the polymeric moisture absorbing material 2 disposed on a surface of the base material 3. In this case, the polymeric moisture absorbing material 2 is heated with radiant heat, and the base material 3 has a reduced heat loss.

In the example described above, the dehumidifying device 101 includes a housing, an air inlet 5, an inlet air filter 6, an air blowing fan 8, an air outlet 7, and a water drain tank 9. This dehumidifying device 101 is usable by itself as a humidity control device as well. The dehumidifying device 101 may alternatively be configured to not include the above members and to include only a dehumidifying section. The dehumidifying device 101 may, in other words, include at least a moisture absorbing unit 1, a stepping motor 10, and a transfer section 15. The dehumidifying device 101 can, in this case, be incorporated in a humidity control device as a component thereof.

The example described above uses a plate-shaped heater 4 to provide a thermal stimulus to a polymeric moisture absorbing material 2 efficiently. The shape of the heater 4 is, however, not limited to that of a plate, and may be any shape that allows the heater 4 to be placed along the polymeric moisture absorbing material 2. Any heating device other than a heater 4 may alternatively be used as long as heat as a stimulus can be applied to the polymeric moisture absorbing material 2. Examples of such a heating device include a halogen lamp, an infrared lamp, and a xenon lamp.

The example described above uses a plate-shaped or layer-shaped polymeric moisture absorbing material as the polymeric moisture absorbing material 2. The shape of the polymeric moisture absorbing material 2 is, however, also not limited to a plate or layer. The polymeric moisture absorbing material 2 may be, for example, in the form of particles. In such a case, the dehumidifying device 101 preferably includes a network heat transfer structure or hot-air heating structure to be capable of heating individual particles.

In the example described above, the moisture absorbing unit 1 includes 12 elements described above. The number of elements is, however, not limited to 12. Further, in the example described above, there are three elements in the release region 24 and nine elements in the moisture absorption region 25. The ratio is, however, not limited to this, and may be changed as appropriate.

In the example described above, the moisture absorbing unit 1 is configured to be driven by the stepping motor 10 to rotate at predetermined time intervals. The moisture absorbing unit 1 may alternatively be rotated in response to a user's instruction or in a case where a sensor provided on the airflow path in the moisture absorption region 25 to sense the amount of moisture absorption has sensed that the amount of moisture absorption has reached a predetermined value or higher.

The dehumidifying device 101 may include a heater-specific fixed electrode(s) that is positioned so as to come into contact with the heater 4 of an element(s) among the elements present in the release region 24 or with the heater 4 of a single one of the elements present in the release region 24. The dehumidifying device 101 may, for example, include a heater-specific fixed electrode that is positioned so as to come into contact with the heater 4 of an element of the moisture absorbing unit 1 which element has reached the lowermost position. The dehumidifying device 101 may alternatively be configured such that a heater-specific fixed electrode(s) is positioned so as to come into contact with the heater 4 of an element(s) among the elements present in the release region 24.

The example described above uses, as the polymeric moisture absorbing material 2, a polymeric moisture absorbing material containing a temperature-responsive polymer having an LCST. The polymeric moisture absorbing material may, however, alternatively contain a temperature-responsive polymer having no LCST. The polymeric moisture absorbing material may further alternatively contain a stimuli-responsive polymer that responds to another stimulus. In a case where the polymeric moisture absorbing material contains a stimuli-responsive polymer that responds to another stimulus, the heater 4 may simply be replaced as a stimulus providing section with a device configured to provide such another stimulus, for example, infrared radiation, ultraviolet radiation, light such as visible light, electric field, or magnetic field.

The shape of each element included in the moisture absorbing unit 1, the intervals between the elements, the shape of the airflow restriction wall 23, the position of the water drain tank 9, the shape of the housing, and the like are not limited to those illustrated in FIGS. 2 and 3, and may be changed as appropriate.

Embodiment 2

Figure 8:
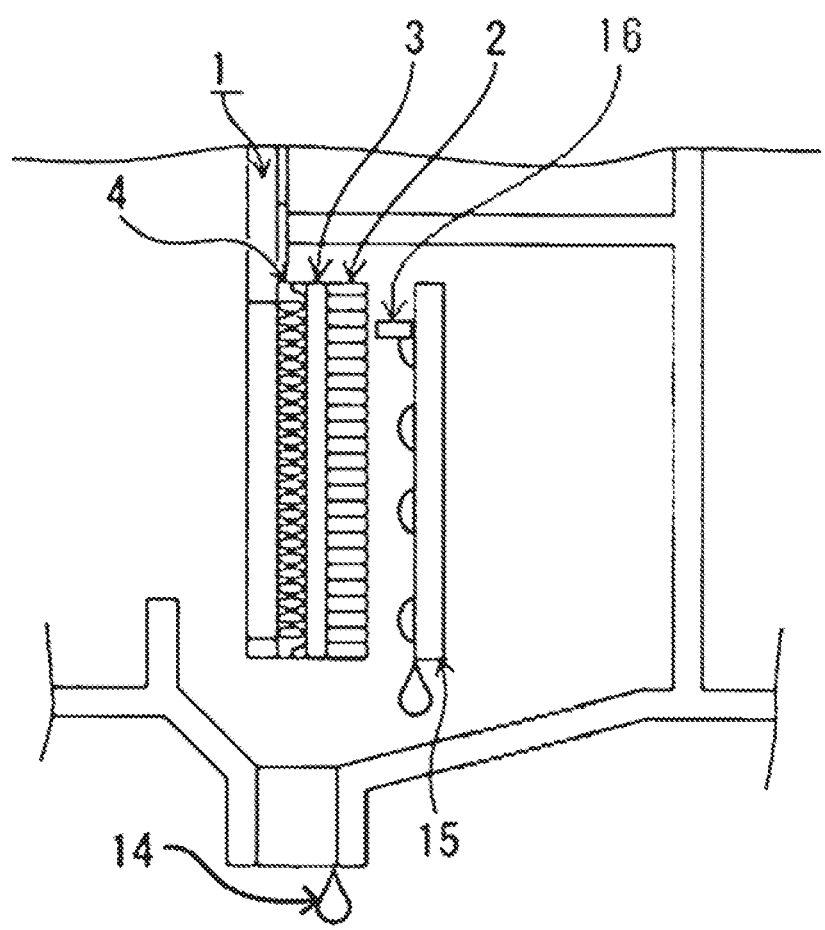
FIG. 8 is a diagram illustrating an operation of a water droplet removing section of a dehumidifying device in accordance with Embodiment 2 of the present invention.

The following description will discuss another embodiment of the present invention in detail. Embodiment 2 includes, in addition to the members of Embodiment 1, a water droplet removing section 16 to more reliably cause dropping of water droplets that have been transferred on the transfer section 15 of the dehumidifying device 101 of Embodiment 1. This concept is illustrated in FIG. 8. Apart from the above, the present embodiment is identical to Embodiment 1 in terms of the configuration of the dehumidifying device 101. Any member of the present embodiment that is identical in function to a corresponding member of Embodiment 1 is assigned a common reference sign, and is not described here.

The water droplet removing section 16 is disposed in the release region 24, and is controlled by a control section (not shown in the drawings). Although water droplets that have exuded from a polymeric moisture absorbing material 2 of the moisture absorbing unit 1 are transferred onto the transfer section 15, such water droplets do not drop by gravity if they are not large enough. The water droplet removing section 16 is effective in such a case. The water droplet removing section 16 is a plate-shaped member positioned between the moisture absorbing unit 1 and the transfer section 15. The water droplet removing section 16 moves downward from above in FIG. 8 while being in contact with a surface of the transfer section 15 for removal of water droplets. The water droplet removing section 16 can be moved with use of a publicly known mechanism such as a link, a lever, or a cam.

The water droplet removing section 16 of Embodiment 2 is a plate-shaped member. The shape of the water droplet removing section 16 is, however, not limited to any particular one. The water droplet removing section 16 may be in the shape of a bar or a roller. The material of the water droplet removing section 16 is not limited to any particular one, but is preferably an elastic resin or rubber.

Embodiment 3

Figure 9:
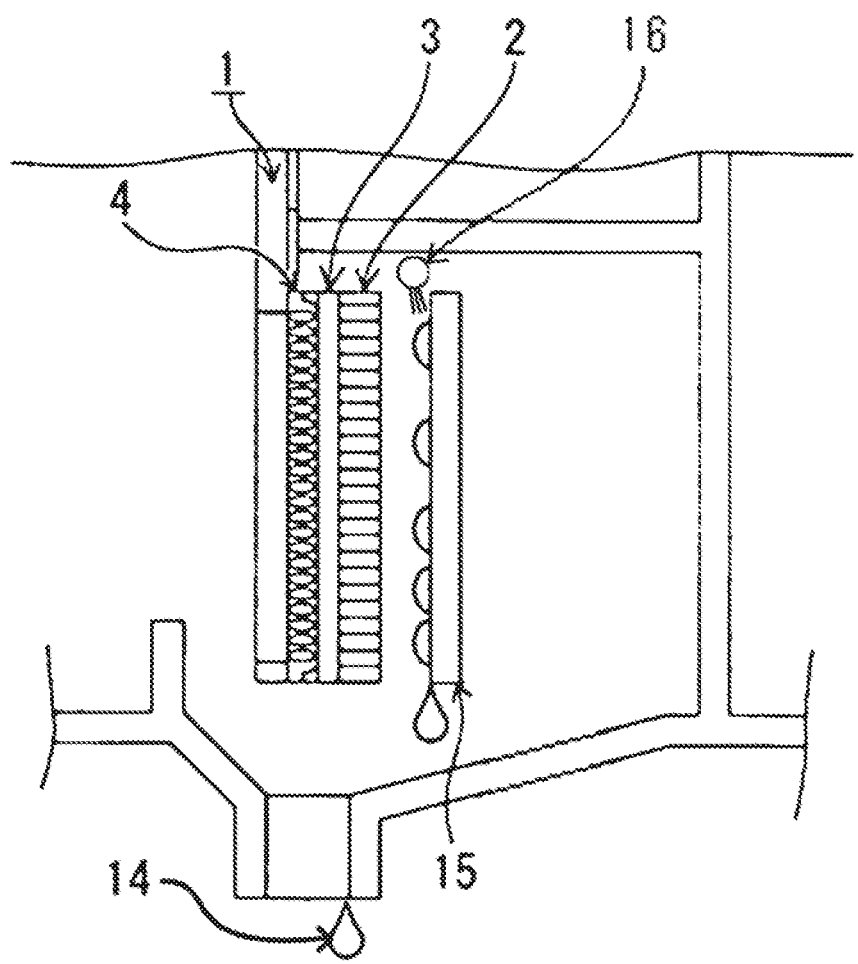
FIG. 9 is a diagram illustrating an operation of a water droplet removing section of a dehumidifying device in accordance with Embodiment 3 of the present invention.

The following description will discuss another embodiment of the present invention in detail. Embodiment 3 corresponds to Embodiment 2, and differs therefrom in that the water droplet removing section 16 of the dehumidifying device 101 is a non-contact type that uses force of air. This concept is illustrated in FIG. 9. Apart from the above, the present embodiment is identical to Embodiment 1 in terms of the configuration of the dehumidifying device 101. Any member of the present embodiment that is identical in function to a corresponding member of Embodiment 1 is assigned a common reference sign, and is not described here.

The water droplet removing section 16 of Embodiment 3 is disposed in the release region 24, and includes an air pump (not shown in the drawings) to blow air for a jet of air from an opening. The air pump is controlled by a control section (not shown in the drawings). The water droplet removing section 16 is so positioned between the moisture absorbing unit 1 and the transfer section 15 as not to prevent the movement of the transfer section 15. The water droplet removing section 16 is not necessarily fixed in position, and may be movable along the surface of the transfer section 15. The water droplet removing section 16 can be moved with use of a publicly known mechanism such as a link, a lever, or a cam.

Water droplets that have exuded from a polymeric moisture absorbing material 2 of the moisture absorbing unit 1 are transferred onto the transfer section 15 and are then moved or blown away downward by air jetted by the water droplet removing section 16. The water droplet removing section 16 is a member in the shape of a tube having closed ends and an opening on a side surface for a jet of air.

The above configuration makes it possible to remove water droplets without causing the water droplet removing section 16 to come into contact with the surface of the transfer section 15. The water droplet removing section 16 is not necessarily of an air-jet type, and may be of a vacuum type that draws in air. The water droplet removing section 16 is, in a case where it is of the vacuum type, preferably moved along the surface of the transfer section 15. Water drawn in is discharged into a water drain tank through a pipe provided separately. The water droplet removing section 16, in a case where it is fixed, prevents itself from damaging polymeric moisture absorbing materials 2 of the moisture absorbing unit 1 as the water droplet removing section 16 might do in a case where it is movable.

Figure 10:
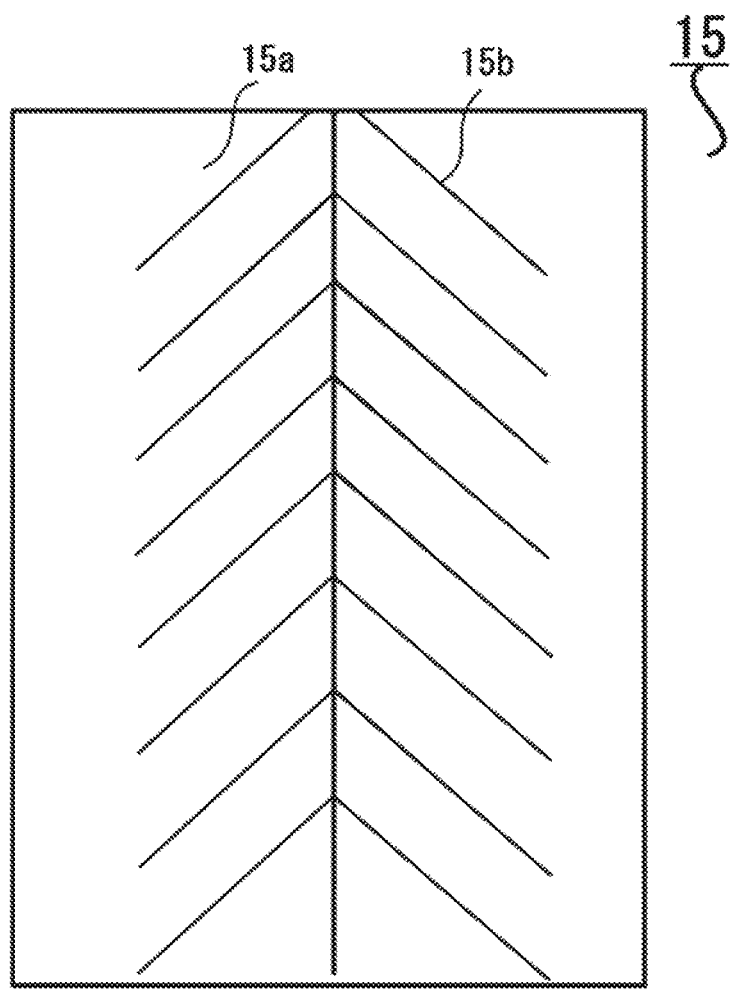
FIG. 10 is a diagram illustrating an example shape of a surface of a transfer section of the dehumidifying device in accordance with any of Embodiments 1 to 3 of the present invention.

The transfer section 15 of each of Embodiments 1 to 3 may be in the shape of a simple flat plate, but may alternatively be in the shape of a flat plate having a surface with a groove or pattern that facilitates dropping of water droplets. An example of such a pattern is illustrated in FIG. 10. The pattern 15b may be grooves each in a straight line on or ribs protruding slightly from the surface 15a of the transfer section 15.

Embodiment 4

The following description will discuss still another embodiment of the present invention in detail. Embodiment 4 differs from Embodiments 1 to 3 in that the moisture absorbing unit 1 and the transfer section 15 are each in the shape of a cylinder.

For convenience of explanation, any member of the present embodiment that is identical in function to a corresponding member of Embodiment 1 is assigned a common reference sign, and is not described here.

Figure 11:
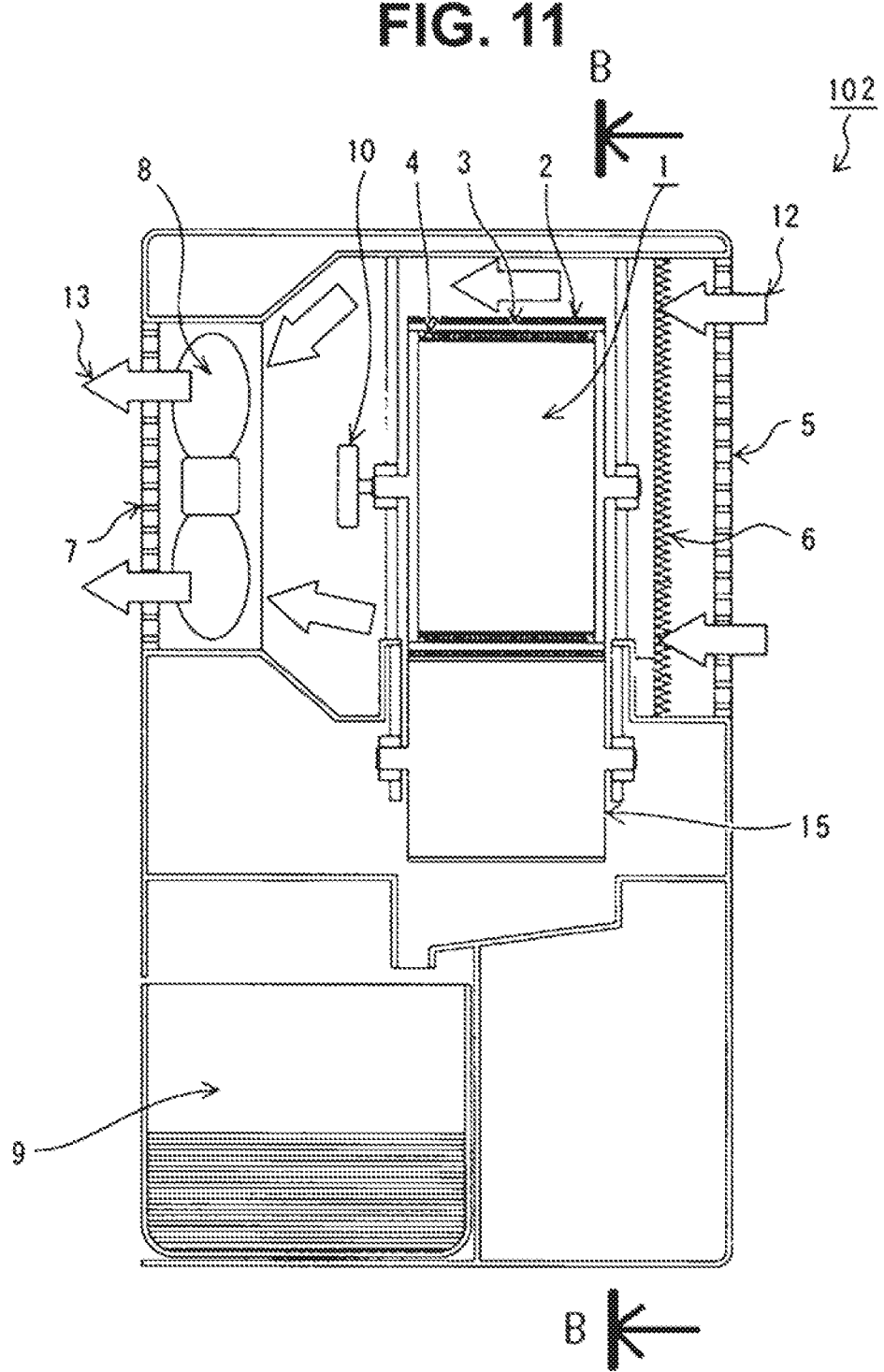
FIG. 11 is a longitudinal cross-sectional view of a dehumidifying device in accordance with Embodiment 4 of the present invention.
Figure 12:
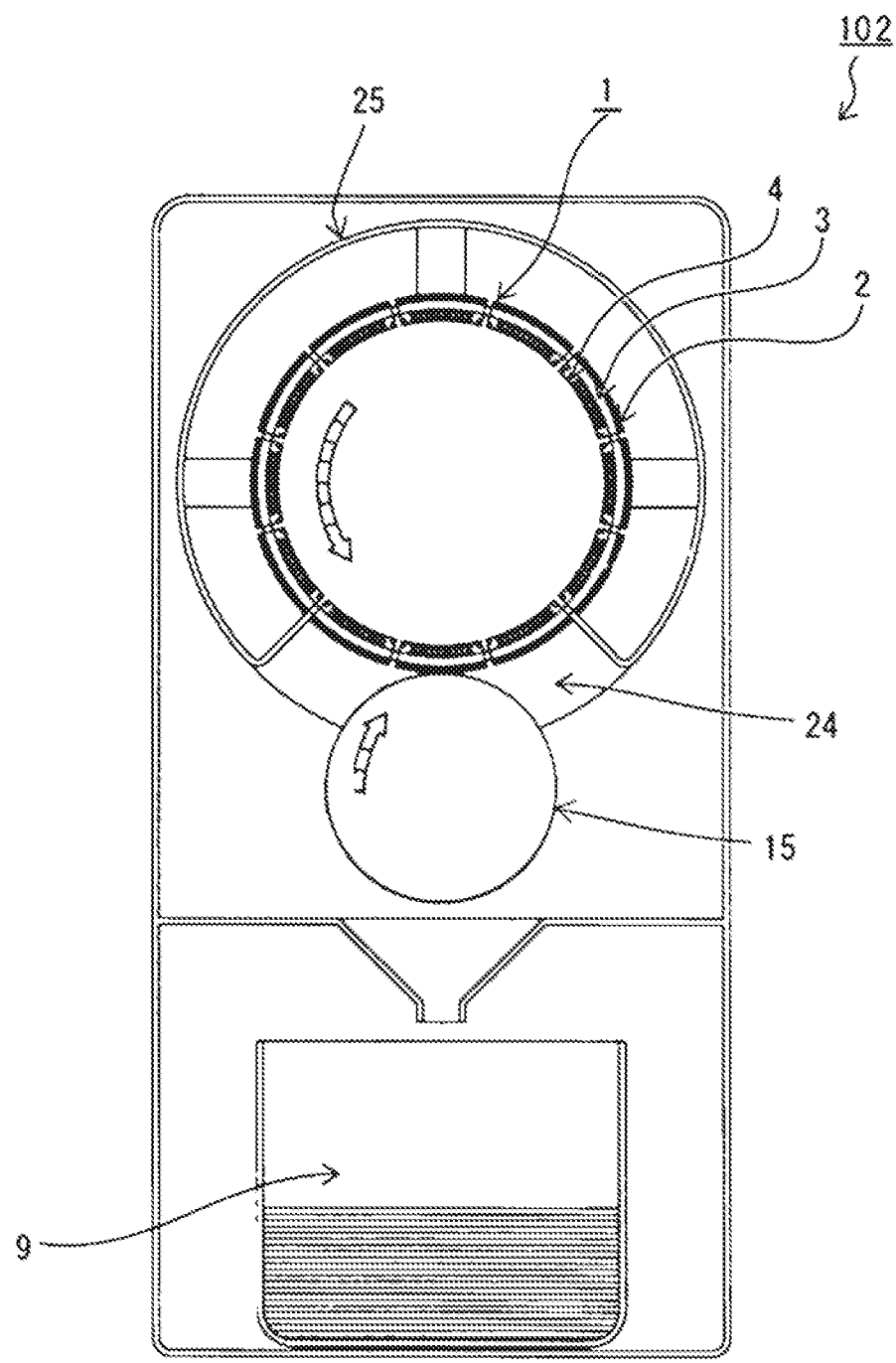
FIG. 12 is a cross-sectional view of the dehumidifying device taken along line B-B in FIG. 11.

FIG. 11 is a longitudinal cross-sectional view of a dehumidifying device 102 in accordance with Embodiment 4 of the present invention. FIG. 12 is a cross-sectional view of the dehumidifying device 102 taken along line B-B in FIG. 11.

In the present embodiment, the air blowing fan 8 is positioned so as to be close to the air outlet. This means that air flows along a path on which are provided the air inlet 5, the inlet air filter 6, the moisture absorbing unit 1, the air blowing fan 8, and the air outlet 7 in this order from the side of the entry of air.

The moisture absorbing unit 1, as illustrated in FIGS. 11 and 12, includes a plurality of elements fixed to the side surface of a cylinder, each of the plurality of elements having a layered structure including a base material 3, a polymeric moisture absorbing material 2 disposed on a first surface of the base material 3, and a heater 4 provided in contact with a second surface of the base material 3. The cylinder is contained in the dehumidifying device 102 and has a central axis that coincides with the rotary shaft of a stepping motor 10 which rotary shaft extends in a direction perpendicular to that side surface of the housing in which the air inlet 5 is present. The individual elements are arranged next to each other at even intervals on the side surface of the cylinder.

The moisture absorbing unit 1 is rotatable about the rotary shaft of the stepping motor 10 in the direction indicated with the arrow in FIG. 12 (counterclockwise). The moisture absorbing unit 1 is driven by the stepping motor 10 to rotate at predetermined time intervals. The moisture absorbing unit 1 may be rotated in such a manner that a single element is moved from the moisture absorption region 25 to the release region 24 at each predetermined time interval, or may be rotated slowly and continuously so that the individual elements are sequentially moved from the moisture absorption region 25 to the release region 24. The predetermined time intervals vary according to the moisture absorbing and releasing property of the polymeric moisture absorbing material, and is selected appropriately.

Embodiment 4 is configured such that the individual elements of the moisture absorbing unit 1 each have a transverse cross section in the shape of a circular arc such that the individual elements together form a cylinder when arranged close to one another on the side surface of the cylinder. In other words, the combination of the base material 3, the polymeric moisture absorbing material 2, and the heater 4 has a transverse cross section having the shape of a plate curved in the form of a circular arc. The individual elements of the moisture absorbing unit 1 are each configured in such a manner that the polymeric moisture absorbing material 2 is positioned on an outer side of the circular arc, and the heater 4 is positioned on an inner side of the circular arc.

As illustrated in FIG. 12, the moisture absorbing unit 1 is rotated in a region divided into (i) a moisture absorption region 25, which is positioned in an upper portion of the dehumidifying device 102, and (ii) a release region 24, which is positioned in a lower portion of the dehumidifying device 102. Each time the moisture absorbing unit 1 is rotated at the predetermined time interval, one of the individual elements moves from the moisture absorption region 25 into the release region 24, and another one of the individual elements moves from the release region 24 into the moisture absorption region 25. Embodiment 4 is configured such that three elements positioned in a lower portion of the dehumidifying device 102 are in the release region 24.

The dehumidifying device 102 includes in the release region 24 a heater-specific fixed electrode(s) (not shown in the drawings) positioned so as to, for conduction of electricity to the heater 4 of an element(s) in the release region 24, come into contact with a heater electrode of that heater 4. With this configuration, when the individual elements of the moisture absorbing unit 1 have each reached the release region 24, the heater 4 of the element is supplied with electricity and turned on.

The dehumidifying device 102 further includes in the release region 24 a transfer section 15 positioned under and in contact with the moisture absorbing unit 1. This transfer section 15 corresponds to the transfer section 15 of Embodiment 1, and differs therefrom in that it is in the shape of a cylinder. The transfer section 15 is disposed in such a manner as to have a surface in contact with a surface of the polymeric moisture absorbing material 2, and is rotated through rotation of the moisture absorbing unit 1.

When an element of the moisture absorbing unit 1 has moved into the release region 24 as a result of the rotation of the moisture absorbing unit 1, the heater 4 of that element heats the polymeric moisture absorbing material 2 to the LCST or higher. This causes water droplets to exude from the polymeric moisture absorbing material 2, which water droplets are then transferred onto the transfer section 15.

With the airflow restriction wall 23, air that has been taken in through the air inlet 5 passes through only the moisture absorption region 25 and is prevented from flowing through the release region 24.

The dehumidifying device 102 has a drip opening at the bottom of the release region 24, and includes a water drain tank 9 under the drip opening. The water drain tank 9 can be pulled out in the direction in which air is discharged, and receives collected water as it is discharged.

With reference to FIGS. 11 to 15, the following description will discuss how the dehumidifying device 102 removes moisture. First, when the dehumidifying device 102 is turned on, the air blowing fan 8 inside the dehumidifying device 102 is turned on, which in turn causes air (moist air 12) to be taken into the dehumidifying device 102 through the air inlet 5 and flow through the inlet air filter. The moisture absorbing unit 1 is driven by the stepping motor 10 to rotate around the rotary shaft of the stepping motor 10 at a predetermined rate of rotation.

The air (moist air 12) that has been taken into the dehumidifying device 102 comes into contact with polymeric moisture absorbing materials 2 of the moisture absorbing unit 1 when passing through the moisture absorption region 25. In the moisture absorption region 25, the heater 4 is not turned on. The polymeric moisture absorbing material 2, which is hydrophilic at room temperature, absorbs moisture present in the air (moist air 12). The moist air is thus dehumidified when passing through the moisture absorption region 25. Then, air (dry air 13) that has been obtained by dehumidifying the moist air is discharged through the air outlet 7.

The individual elements of the moisture absorbing unit 1, which have absorbed moisture present in the air (moist air 12), are driven by the stepping motor 10 to rotate in the direction indicated with the arrows in FIGS. 12 to 15 so as to sequentially move from the moisture absorption region 25 to the release region 24. In the release region 24, the heater electrode of the heater 4 of each element comes into contact with a heater-specific fixed electrode (not shown in the drawings) for conduction of electricity. This causes the polymeric moisture absorbing material 2 of the element to be heated by the heater 4.

Since the heater 4 heats the base material 3 and heats the polymeric moisture absorbing material 2 through the base material 3, the temperature of the polymeric moisture absorbing material 2 reaches an LCST or higher, so that the polymeric moisture absorbing material 2 has a decreased affinity with water to become hydrophobic. This causes the moisture absorbed by the polymeric moisture absorbing material 2 to be released from the polymeric moisture absorbing material 2 in the form of liquid water.

Figure 13:
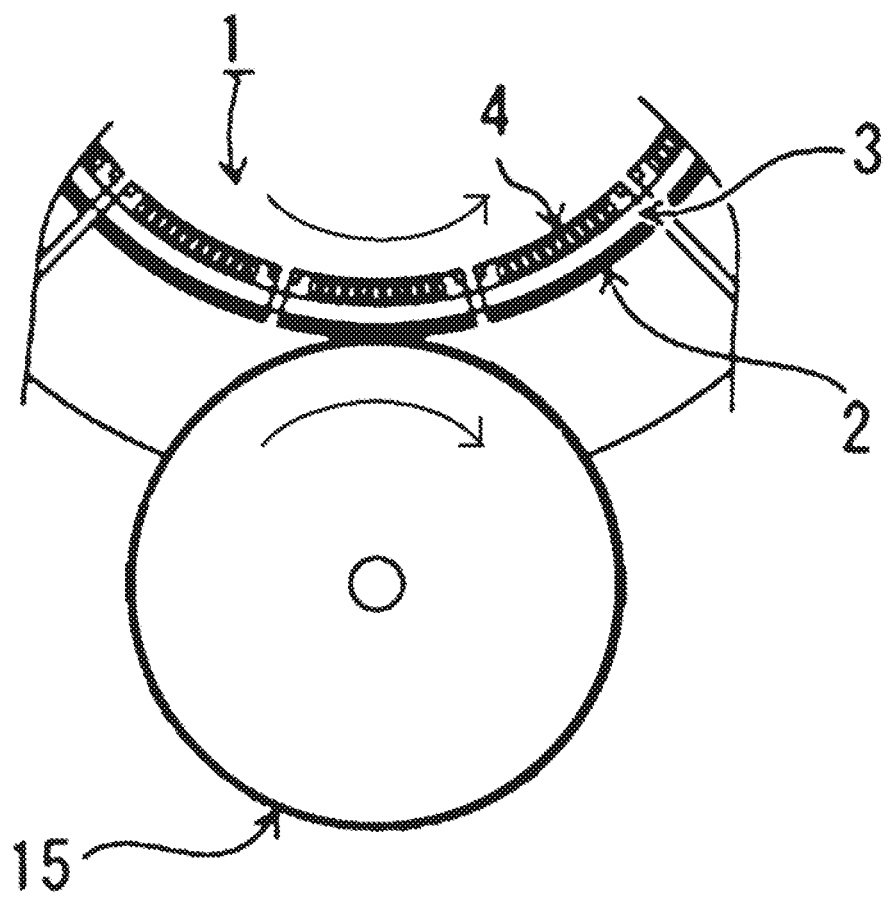
FIG. 13 is a diagram illustrating an element of a moisture absorbing unit which element has moved into a release region as a result of rotation of the moisture absorbing unit in Embodiment 4 of the present invention.
Figure 14:
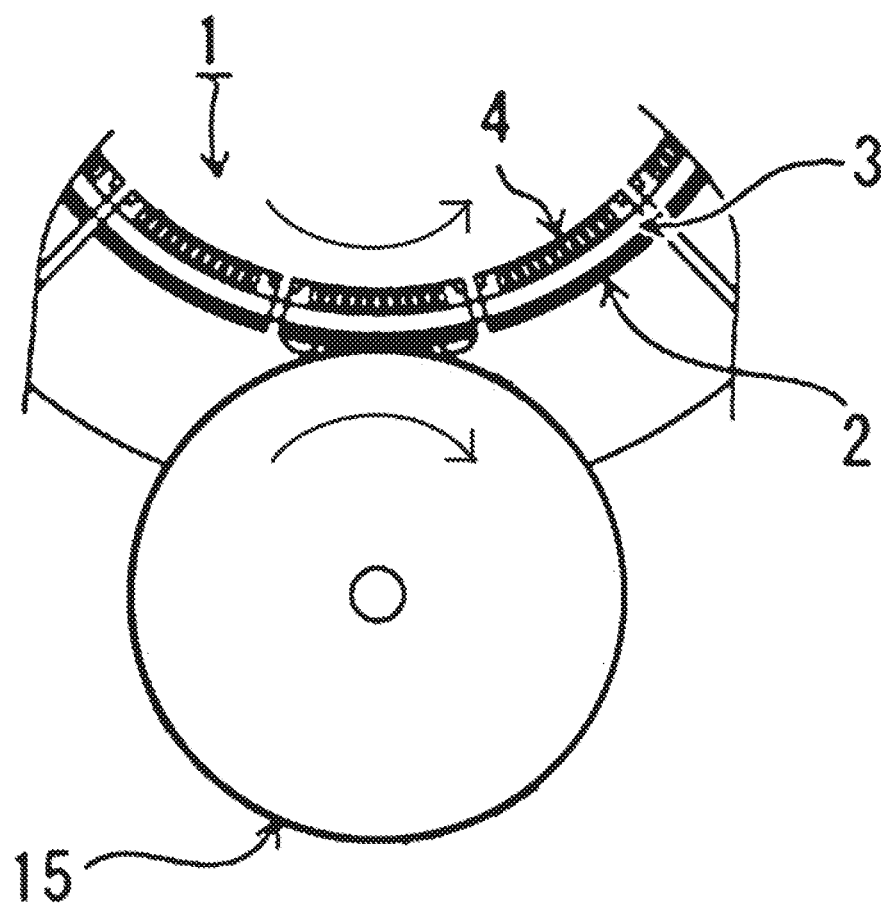
FIG. 14 is a diagram illustrating an element of a moisture absorbing unit in a state where after the element has been moved into a release region as a result of rotation of the moisture absorbing unit, water has exuded due to heating in Embodiment 4 of the present invention.
Figure 15:
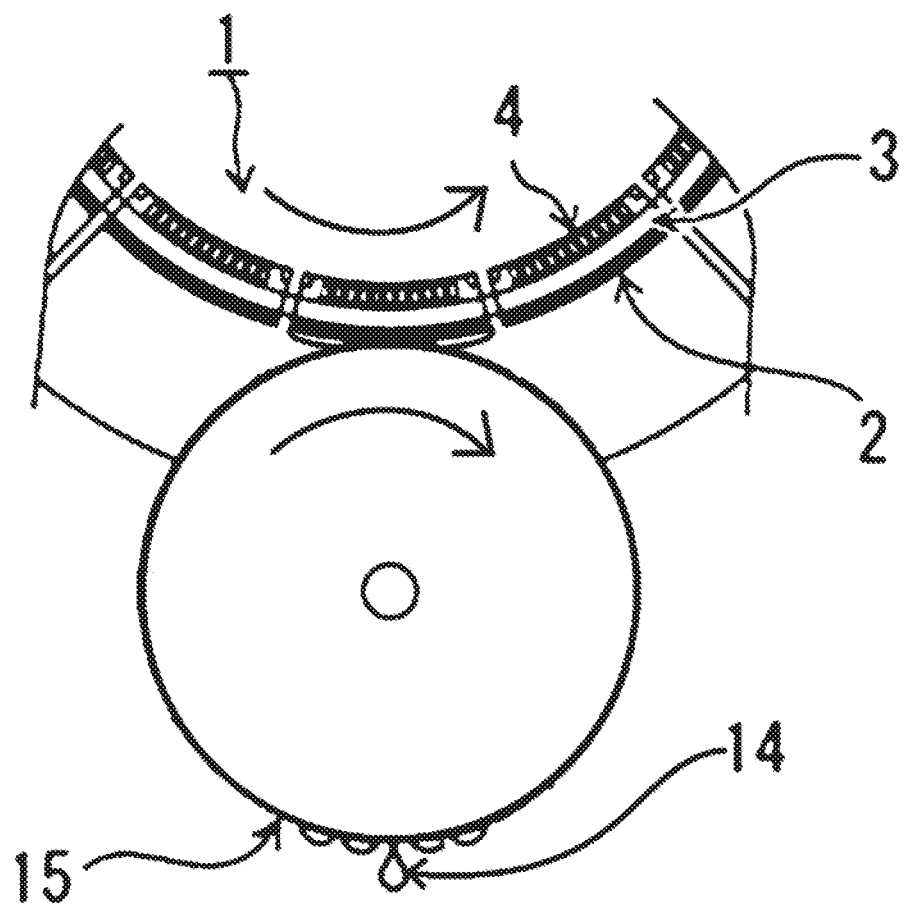
FIG. 15 is a diagram illustrating a dehumidifying element of a moisture absorbing unit in a state where water released by the element has been transferred on a surface of a cylindrical transfer section in Embodiment 4 of the present invention.

FIG. 13 is a diagram illustrating an element of the moisture absorbing unit 1 which element has moved to the lowermost position as a result of rotation of the moisture absorbing unit 1. At this stage, water released from the polymeric moisture absorbing material 2 has not yet been extracted to appear on a surface of the polymeric moisture absorbing material 2. FIG. 14 is a diagram illustrating an element of the moisture absorbing unit 1 which element, after having moved to the lowermost position of the dehumidifying device 102 as a result of rotation of the moisture absorbing unit 1, has water droplets exuded from the polymeric moisture absorbing material 2 and is in contact with the transfer section 15. FIG. 15 is a diagram illustrating how released water has been transferred on the surface of the transfer section 15 and the water droplets run down the surface to drop. Water thus discharged is collected in the water drain tank 9 as drop water 14.

Embodiment 4, as well as Embodiment 1, advantageously provides, to a polymeric moisture absorbing material that has absorbed atmospheric water, an external stimulus so that water exudes from the polymeric moisture absorbing material, and produces the effect resulting from causing a transfer section to come into contact with a surface of a polymeric moisture absorbing material that has a decreased affinity with water.

The material for the base material 3 and the method for rotating the moisture absorbing unit 1 are identical to those in Embodiment 1. The stimuli-responsive polymer contained in the polymeric moisture absorbing material 2, the stimulus providing section, the shape and type of the heater 4, the shape of the polymeric moisture absorbing material 2, and the configuration of the stimulus providing section may be varied as in Embodiment 1.

Note that in the example described above, the individual elements of the moisture absorbing unit 1 are each configured such that the polymeric moisture absorbing material 2 is positioned on an outer side of the circular arc and that the heater 4 is positioned on an inner side of the circular arc. Alternatively, the individual elements of the moisture absorbing unit 1 may be configured in a reversed manner such that the polymeric moisture absorbing material 2 is positioned an inner side of the circular arc and that the heater 4 is positioned on an outer side of the circular arc. In such a case, the heater-specific fixed electrode is positioned outside of the moisture absorbing unit 1.

Embodiment 4 is configured such that three elements positioned in a lower portion of the dehumidifying device 102 are in the release region 24. The dehumidifying device 102 includes in the release region 24 (*i*) a heater-specific fixed electrode (not shown in the drawings) positioned so as to, for conduction of electricity to the heater 4 of the element that has last entered the release region 24, come into contact with a heater electrode of that heater 4 and (ii) another heater-specific fixed electrode (not shown in the drawings) positioned so as to, for conduction of electricity to the heater 4 of the element at the lowermost point of the release region 24, come into contact with a heater electrode of that heater 4. The dehumidifying device 102 is preferably configured such that the conduction of electricity to the heater 4 ends before that element has entirely moved out of the release region 24 into the moisture absorption region 25 as a result of rotation of the moisture absorbing unit 1.

Embodiment 5

Embodiment 5 corresponds to Embodiment 4, and additionally includes a water droplet removing section 16. The other members and their respective operations are identical to those for Embodiment 4, and are not described here.

Figure 16:
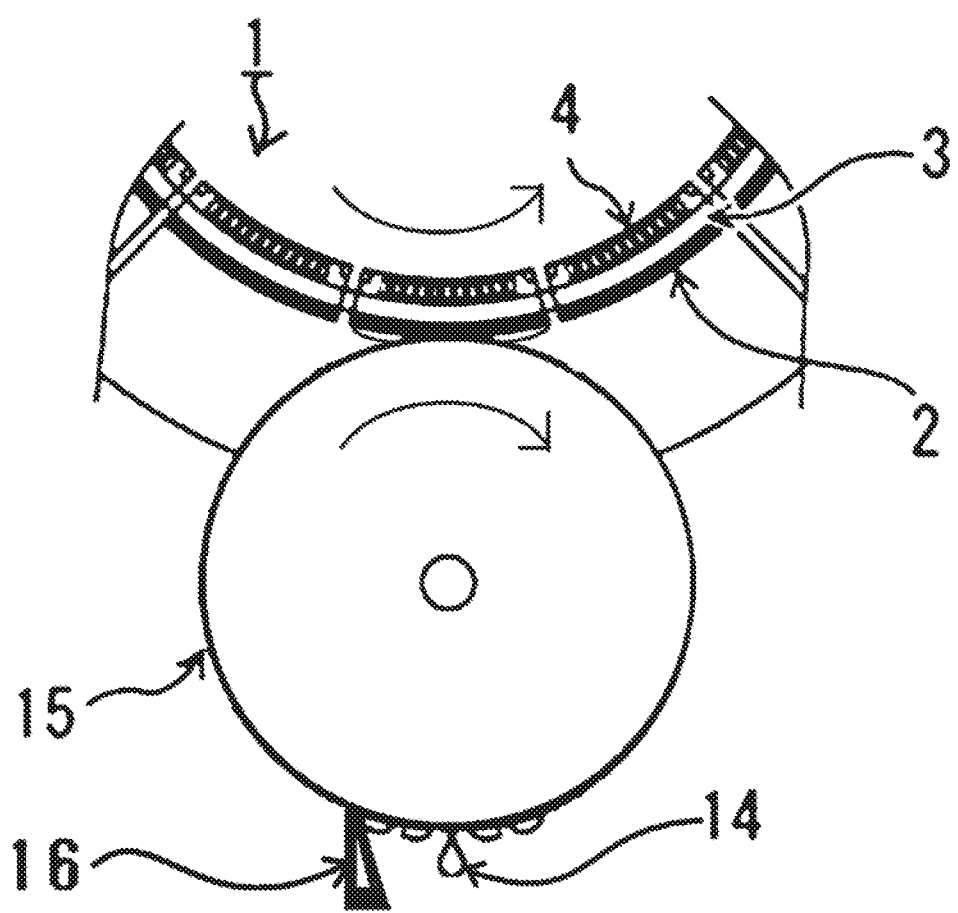
FIG. 16 is a diagram illustrating an operation of a water droplet removing section of a dehumidifying device in Embodiment 5 of the present invention.

FIG. 16 illustrates a water droplet removing section 16 in accordance with Embodiment 5. The water droplet removing section 16 is disposed under the transfer section 15 and in contact with the peripheral surface of the transfer section 15. The moisture absorbing unit 1 and the transfer section 15 are each rotated in the direction indicated with the corresponding arrow in FIG. 16.

The moisture absorbing unit 1 adsorbs atmospheric moisture and is rotated, which causes each element to move into the release region 24. The polymeric moisture absorbing material 2 of the element is then heated by the heater 4 and thus releases water, which is then extracted and transferred onto the surface of the transfer section 15. The water released as above runs down the surface of the transfer section 15 to reach the lowermost position. At this stage, a large number of water droplets drop into the water drain tank 9 to be collected therein. Water droplets that do not drop as above are forced by the water droplet removing section 16 to come off the surface of the transfer section 15 to be collected in the water drain tank 9.

As described above, rotation of the moisture absorbing unit 1 causes each element to sequentially move to the lowermost position on the cylinder of the moisture absorbing unit 1, and water extracted from the element is moved via the transfer section 15 into the water drain tank 9. This causes continuous repetition of absorption and release of atmospheric water by the individual elements of the moisture absorbing unit 1.

Embodiment 5 is configured such that the water droplet removing section 16 is disposed under the transfer section 15 and at a position downstream of the lowermost point in the direction of rotation of the transfer section 15. Embodiment 5 may alternatively be configured such that the water droplet removing section 16 is disposed at the lowermost point or at a position upstream of the lowermost point in the direction of rotation of the transfer section 15. In a case where the water droplet removing section 16 is disposed at a position downstream of the lowermost point in the direction of rotation of the transfer section 15, the surface of the transfer section 15 is moved in such a direction as to become away in the rotation direction from the portion at which the water droplet removing section 16 is in contact with the transfer section 15. This allows a smooth contact.

The water droplet removing section 16 is a plate-shaped or bar-shaped structure. The shape of the water droplet removing section 16 is, however, not limited to any particular one as long as the water droplet removing section 16 is capable of coming into contact with the surface of the transfer section 15. The water droplet removing section 16 is preferably made of a flexible material that does not absorb water.

The water droplet removing section 16 may be of the non-contact type described for Embodiment 3. The water droplet removing section 16 can be disposed at any position in the vicinity of the circumferential portion of the transfer section 15. The transfer section 15 being configured to rotate eliminates the need to move the water droplet removing section 16, thereby allowing a simplified structure.

In Embodiments 4 and 5, the transfer section 15 may have a surface with a pattern that facilitates removal of water droplets. The pattern may be grooves each in a straight line on or ribs protruding slightly from the surface of the transfer section 15. The shape of the pattern is not limited to any particular one as long as the pattern can facilitate removal of water droplets. An example of the pattern is illustrated in FIG. 10.

Embodiment 6

The following description will discuss still another embodiment of the present invention in detail.

For convenience of explanation, any member of the present embodiment that is identical in function to a corresponding member of Embodiment 1 is assigned a common reference sign, and is not described here.

Figure 17:
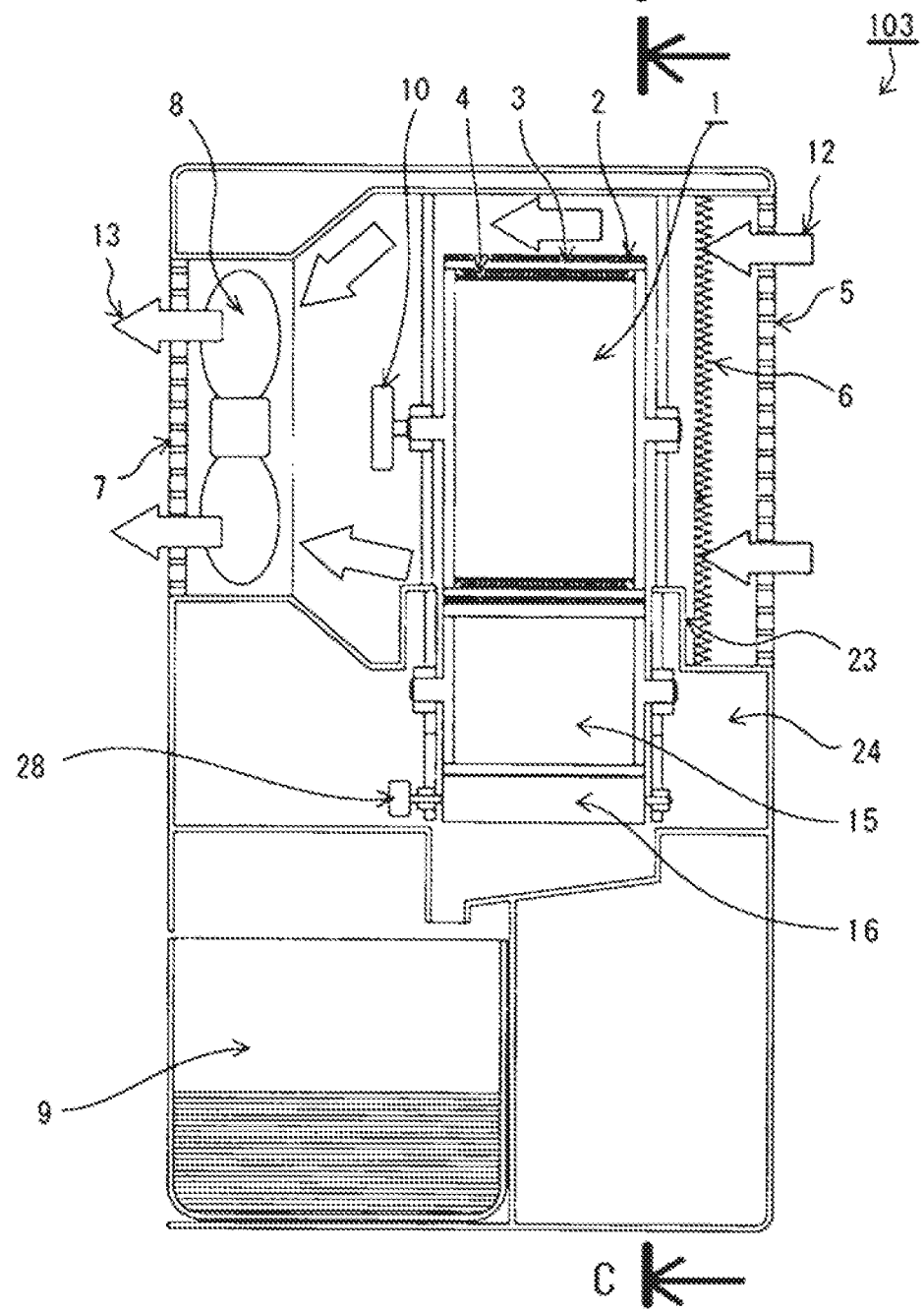
FIG. 17 is a longitudinal cross-sectional view of a dehumidifying device in accordance with Embodiment 6 of the present invention.
Figure 18:
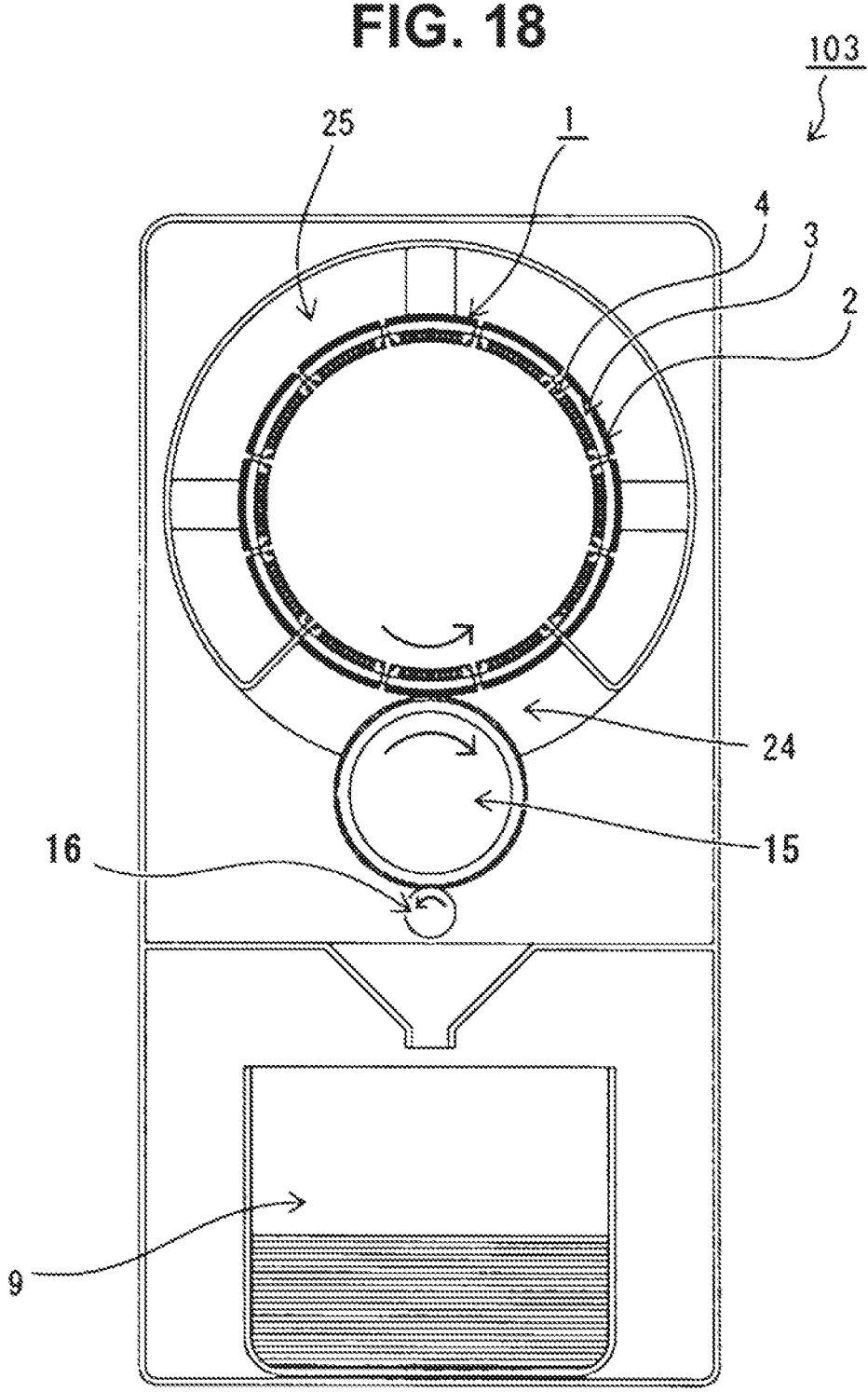
FIG. 18 is a lateral cross-sectional view of the dehumidifying device taken along line C-C in FIG. 17.

FIG. 17 is a longitudinal cross-sectional view of a dehumidifying device 103 in accordance with Embodiment 6 of the present invention. FIG. 18 is a cross-sectional view of the dehumidifying device 103 taken along line C-C in FIG. 17.

Embodiment 6 is a variation of Embodiment 4, and differs therefrom only in the configuration of the release region 24. Specifically, as illustrated in FIGS. 17 and 18, Embodiment 6 includes in the release region 24 (*i*) a cylindrical transfer section 15 in contact with the side surface of the cylinder of a moisture absorbing unit 1 including a plurality of elements fixed to the cylinder and (ii) a cylindrical water droplet removing section 16 in contact with the side surface of the cylinder of the transfer section 15. The transfer section 15 includes a cylindrical rotor and a water-absorbing material fixed to the rotor. The transfer section 15 is in contact with the moisture absorbing unit 1, so that the transfer section 15 is rotated together with rotation of the moisture absorbing unit 1.

The water-absorbing material of the transfer section 15 is, for example, a water-absorbing sponge or nonwoven fabric. The cylindrical water droplet removing section 16 is disposed under the transfer section 15 and in contact with the side surface of the cylindrical transfer section 15. The water droplet removing section 16 is a cylindrical member made of a material that does not absorb water. The water droplet removing section 16 is driven by a water droplet removing section motor 28, and is rotated together with rotation of the transfer section 15.

Figure 19:
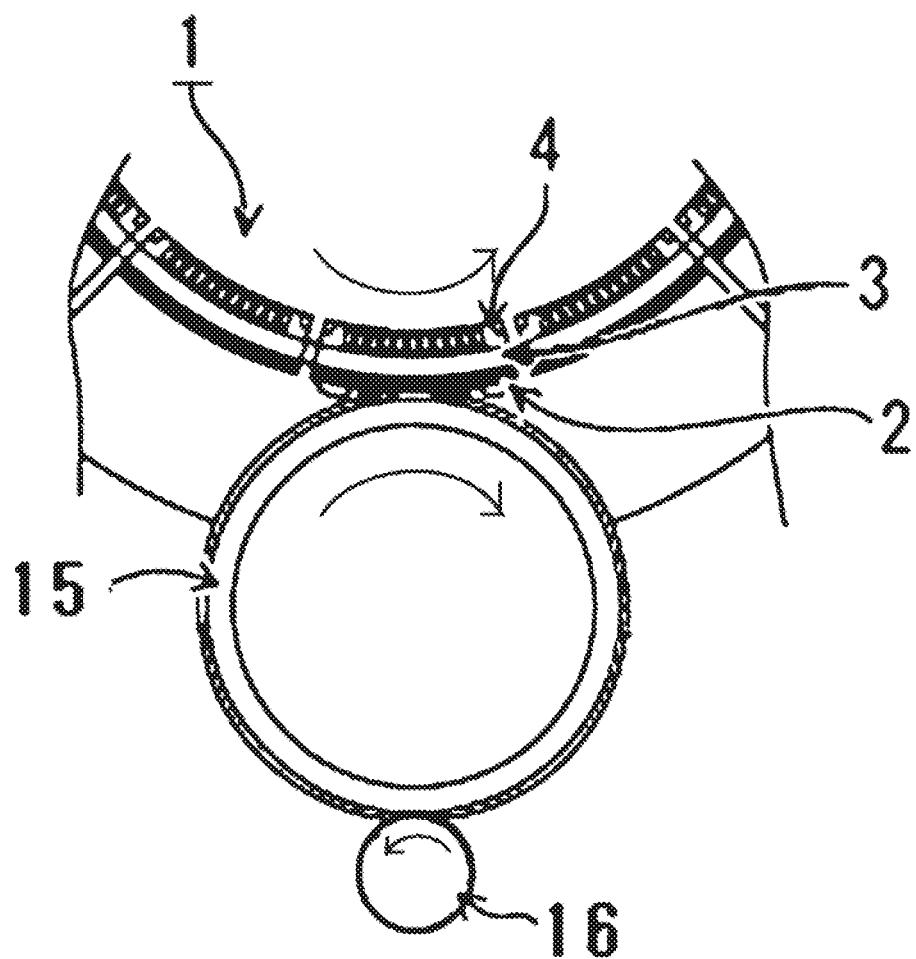
FIG. 19 is a diagram illustrating a dehumidifying element of a moisture absorbing unit in a state where water released by the element is absorbed by a cylindrical transfer section in Embodiment 6 of the present invention.

FIG. 19 is a diagram illustrating an element of the moisture absorbing unit 1 which element has moved to the lowermost position as a result of rotation of the moisture absorbing unit 1. The polymeric moisture absorbing material 2 of this element is heated by the heater 4, so that water released from the polymeric moisture absorbing material 2 exudes from a surface of the polymeric moisture absorbing material 2.

Water having exuded from the surface of the polymeric moisture absorbing material 2 is absorbed by the water-absorbing material of the transfer section 15 in contact with the element. The transfer section 15 is rotated in contact with the moisture absorbing unit 1 in the direction indicated with the arrow in FIG. 19. Water droplets released by the individual elements are sequentially absorbed by and accumulates in the water-absorbing material of the transfer section 15.

Figure 20:
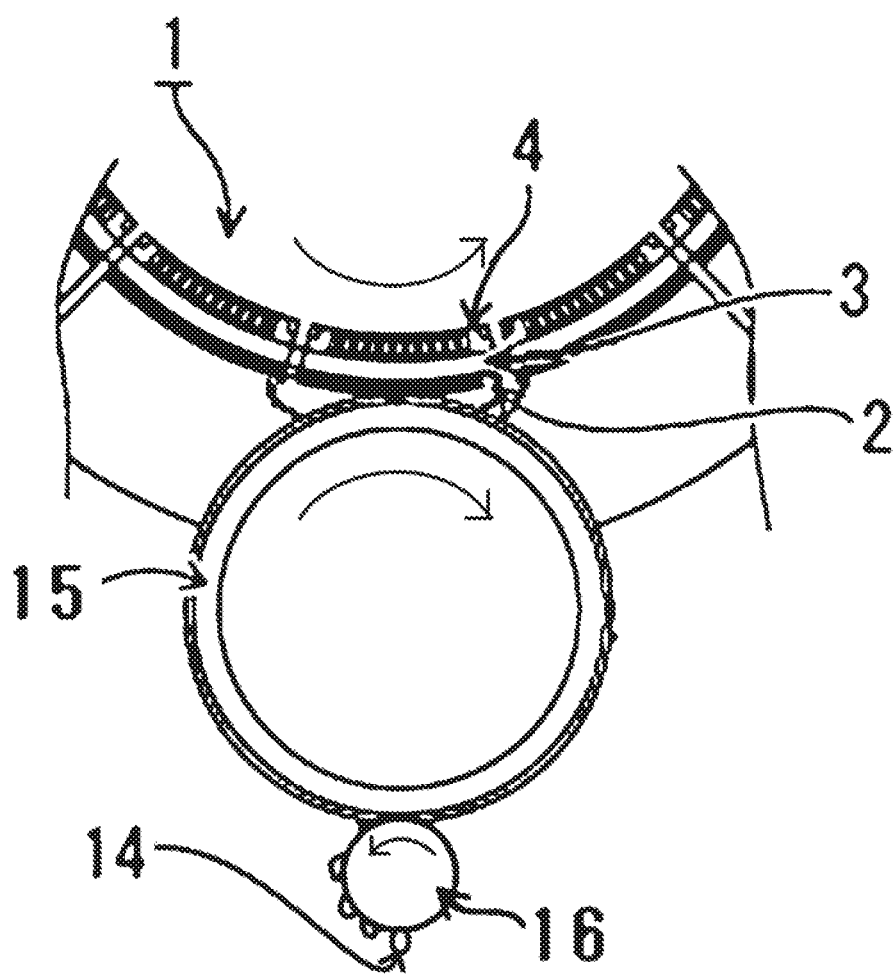
FIG. 20 is a diagram illustrating how water absorbed by a transfer section is pushed by a water droplet removing section out of the transfer section in Embodiment 6 of the present invention.

As illustrated in FIG. 20, the water droplet removing section 16 is so disposed under the transfer section 15 as to be in contact with the side surface of the cylinder of the transfer section 15. The water droplet removing section 16 is positioned relative to the transfer section 15 in such a manner that the water-absorbing material of the transfer section 15 is compressed constantly. When water droplets have accumulated in the transfer section 15 in an amount larger than the amount of water that the water-absorbing material of the transfer section 15 is capable of retaining in a state where the water-absorbing material is compressed, water is pushed by the water droplet removing section 16 out of the water-absorbing material and drops off. The water thus dropped is collected in the water drain tank 9 to be discharged.

As described above, rotation of the moisture absorbing unit 1 causes each element to sequentially move to the lowermost position on the cylinder of the moisture absorbing unit 1, and water extracted from the element is moved into the water-absorbing material of the transfer section 15. This causes continuous repetition of absorption and release of atmospheric water by the individual elements of the moisture absorbing unit 1.

Embodiment 7

The following description will discuss still another embodiment of the present invention in detail.

For convenience of explanation, any member of the present embodiment that is identical in function to a corresponding member of Embodiment 1 is assigned a common reference sign, and is not described here.

Figure 21:
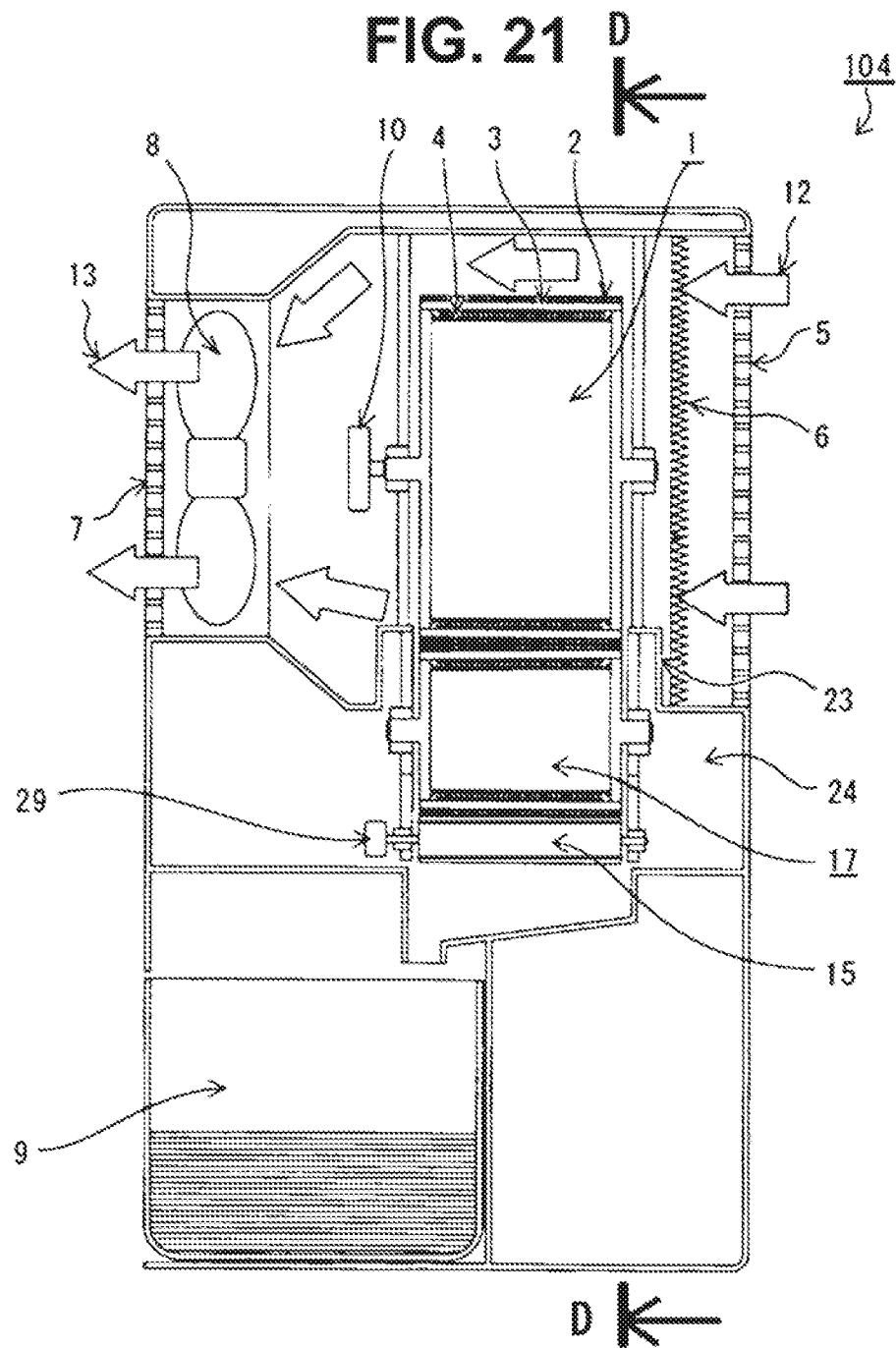
FIG. 21 is a longitudinal cross-sectional view of a dehumidifying device in accordance with Embodiment 7 of the present invention.
Figure 22:
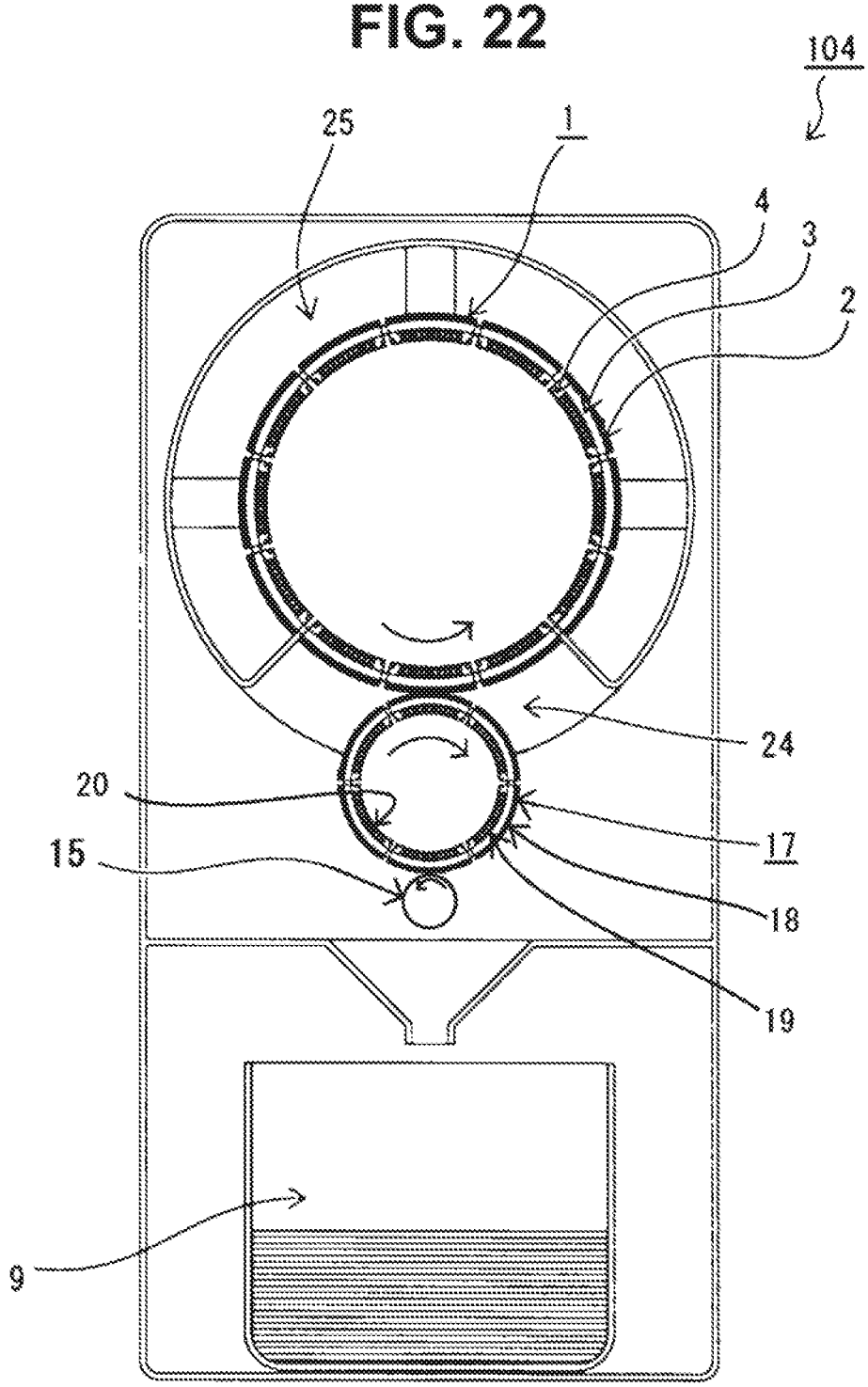
FIG. 22 is a lateral cross-sectional view of the dehumidifying device taken along line D-D in FIG. 21.

FIG. 21 is a longitudinal cross-sectional view of a dehumidifying device 104 in accordance with Embodiment 7 of the present invention. FIG. 22 is a cross-sectional view of the dehumidifying device 105 taken along line D-D in FIG. 21.

Embodiment 7 is a variation of Embodiment 6, and differs therefrom in that a concentrating section 17 is provided in place of the water-absorbing transfer section 15 of Embodiment 6. As illustrated in FIGS. 21 and 22, Embodiment 7 includes a cylindrical concentrating section 17 in the release region 24. The concentrating section 17 has a side surface in contact with the side surface of the cylinder of the moisture absorbing unit 1 to which cylinder a plurality of elements are fixed.

The concentrating section 17 is similar in structure to the moisture absorbing unit 1. Specifically, the concentration section 17 includes a cylindrical rotor and a plurality of elements arranged on the rotor, the plurality of elements each including a base material 19, a polymeric moisture absorbing material 18 on a surface of the rotor, and a heater 20 on another surface of the rotor. The concentration section 17 is configured to be rotated by being in contact with the moisture absorbing unit 1. The concentrating section 17 of Embodiment 7 includes six such elements attached to the rotor. The polymeric moisture absorbing material 18 preferably has an LCST equal to or higher than that of the polymeric moisture absorbing material 2.

The dehumidifying device 104 includes under the concentrating section 17 a cylindrical transfer section 15 having a side surface in contact with the side surface of the cylinder of the concentrating section 17. The transfer section 15 is driven by a transfer section motor 29, and is rotated together with rotation of the concentrating section 17.

Figure 23:
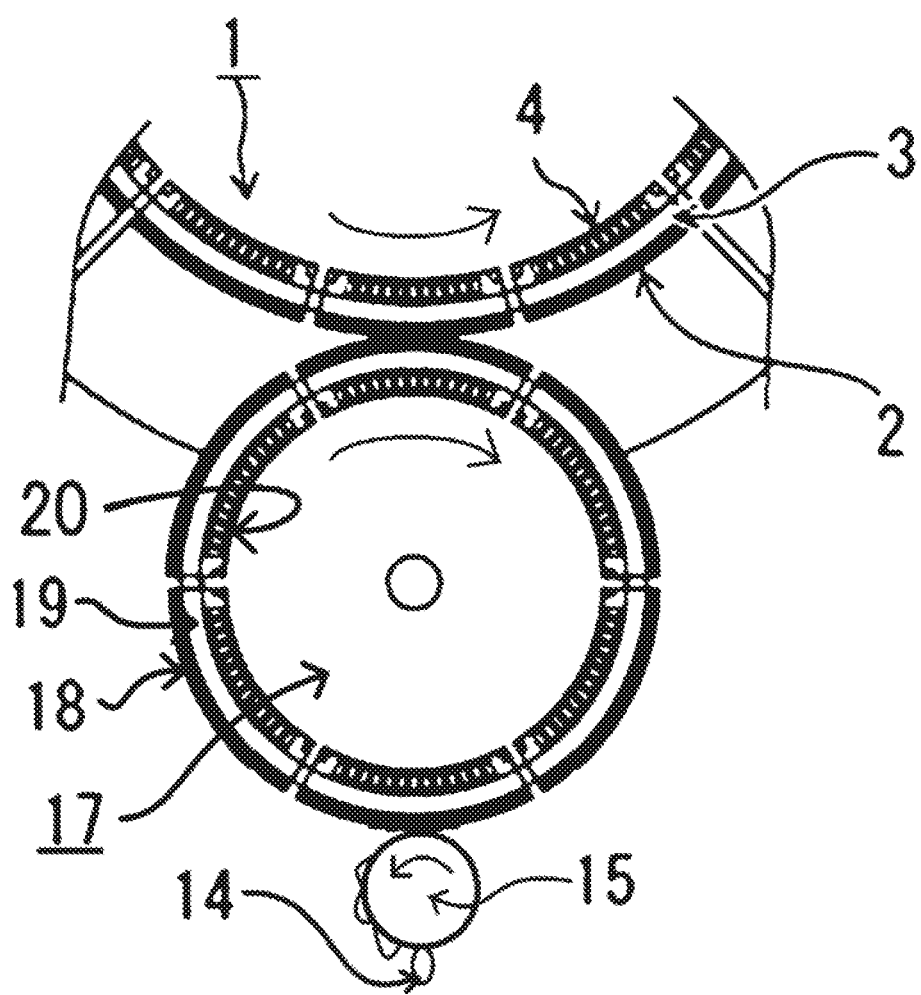
FIG. 23 is a diagram illustrating a dehumidifying element of a moisture absorbing unit in a state where water released by the element is absorbed by a cylindrical transfer section in Embodiment 7 of the present invention.

FIG. 23 illustrates how water is collected in Embodiment 7. After the individual elements of the moisture absorbing unit 1 have each moved to the lowermost position as a result of the rotation of the moisture absorbing unit 1, the polymeric moisture absorbing material 2 of the element is heated by the heater 4, so that water exudes from a surface of the polymeric moisture absorbing material 2. Next, a polymeric moisture absorbing material 18 on the surface of the concentrating section 17 absorbs the water that has exuded from the surface of the polymeric moisture absorbing material 2 of the moisture absorbing unit 1. At this stage, that element of the concentrating section 17 which is in contact with the moisture absorbing unit 1 has not been heated and is hydrophilic.

When rotation of the moisture absorbing unit 1 has caused an element of the concentrating section 17 which element has absorbed sufficient water to reach the lowermost point, the heater 20 is supplied with electricity from a heater-specific fixed electrode (not shown in the drawings) and thus heats the base material 19 and the polymeric moisture absorbing material 18. This heating extracts water from the polymeric moisture absorbing material 18 so that the water appears on a surface of the polymeric moisture absorbing material 18. The water is transferred onto the transfer section 15, and is discharged in the form of water droplets.

As described above, rotation of the moisture absorbing unit 1 causes each element to sequentially move to the lowermost position on the cylinder of the moisture absorbing unit 1, and water extracted from the element is moved into a polymeric moisture absorbing material 18 of the concentrating section 17 and then from the polymeric moisture absorbing material 18 into the transfer section 15. This causes continuous repetition of absorption and release of atmospheric water by the individual elements of the moisture absorbing unit 1, absorption and release of water by the concentrating section 17, and transfer of water onto the transfer section 15.

Embodiment 7 is configured such that the amount of polymeric moisture absorbing material 2 in the moisture absorbing unit 1 is four times larger than that of polymeric moisture absorbing material 18 in the concentrating section 17. The concentrating section 17 is rotated four times while the moisture absorbing unit 1 is rotated once, so that water accumulates in the individual elements of the concentrating section 17 at a concentration that is four times higher than that for the moisture absorbing unit 1. As illustrated in FIG. 23, water absorbed by a polymeric moisture absorbing material 18 of the concentrating section 17 is, as the corresponding heater 20 is supplied with electricity at appropriate timing to heat the polymeric moisture absorbing material 18, discharged efficiently. Water appearing on a surface of the polymeric moisture absorbing material 18 can be dropped efficiently by the transfer section 15 to be collected.

Embodiment 7 may alternatively be configured to not include a transfer section 15 and to let water droplets drop directly from a surface of each polymeric moisture absorbing material 18 of the concentrating section 17.

Embodiments 1 to 7 of the present invention are each configured such that the moisture absorbing unit is a collection of elements each including a base material, a polymeric moisture absorbing material on a surface of the base material, and a heater on another surface of the base material. Incorporating a heater in each element is, however, not essential. The present invention may alternatively be configured, for example, such that a heater is disposed as a separate structure in the release region and that when an element of the moisture absorbing unit which element has absorbed moisture has been moved into the release region as a result of rotation of the moisture absorbing unit, the heater comes into contact with the element of the moisture absorbing unit.

The above configuration allows each element to be free of any electrical component, thereby making it possible to easily dispose a polymeric moisture absorbing material on a base material and improving safety of each element itself and the dehumidifying device.

[Details of Polymeric Moisture Absorbing Material]

The following description will discuss in detail a polymeric moisture absorbing material that contains a stimuli-responsive polymer and that is used in the embodiments described above. In the present specification, a substance that may mean either "acrylic" or "methacrylic" is expressed as "(meth)acrylic".

The embodiments described above each use a polymeric moisture absorbing material containing a dried product of a stimuli-responsive polymer. In a case where the stimuli-responsive polymer is crosslinked, in particular, a three dimensional network structure formed by the crosslinked polymer tends to absorb water and a solvent such as an organic solvent to form a swollen polymer gel. In such a case, the embodiments described above each use a dried product of a polymer gel.

The term "dried product of a polymer gel" refers to a product resulting from drying a polymer gel for removal of a solvent. For the present invention, the dried product of a polymer gel is not necessarily a polymer gel from which the solvent has been removed completely; the dried product may contain a solvent or water as long as the dried product is capable of absorbing moisture in the air. The water content of the dried product of a polymer gel is thus not limited to any particular value as long as the dried product is capable of absorbing moisture in the air. The water content is preferably not more than 40% by weight, for example. The term "water content" refers to the proportion of moisture in the polymer gel relative to the dry weight of the polymer gel.

A stimuli-responsive polymer refers to a polymer whose property changes reversibly in response to an external stimulus. Embodiments of the present invention use a stimuli-responsive polymer whose affinity with water changes reversibly in response to an external stimulus.

The external stimulus is not limited to any particular one. Examples include heat, light, electric field, magnetic field, and pH.

The expression "whose affinity with water changes reversibly in response to an external stimulus" describes the affinity of a polymer with water changing reversibly between hydrophilicity and hydrophobicity in response to an external stimulus provided to the polymer.

Among others, a temperature-responsive polymer (that is, a stimuli-responsive polymer whose affinity with water changes reversibly in response to heat) can be used for a humidity controller particularly suitably, as merely changing the temperature of a temperature-responsive polymer with use of a simple heating device allows the temperature-responsive polymer to reversibly absorb moisture in the air (water vapor) and release the absorbed moisture.

Specific examples of the temperature-responsive polymer include poly(N-alkyl(meth)acrylamide) such as poly(N-isopropyl(meth)acrylamide), poly(N-normal propyl(meth)acrylamide), poly(N-methyl(meth)acrylamide), poly(N-ethyl(meth)acrylamide), poly(N-normal butyl(meth)acrylamide), poly(N-isobutyl(meth)acrylamide), and poly(N-t-butyl(meth)acrylamide); poly(N-vinylalkylamide) such as poly(N-vinylisopropylamide), poly(N-vinyl normal propylamide), poly(N-vinyl normal butylamide), poly(N-vinylisobutylamide), and poly(N-vinyl-t-butylamide); poly(N-vinylpyrrolidone); poly(2-alkyl-2-oxazoline) such as poly(2-ethyl-2-oxazoline), poly(2-isopropyl-2-oxazoline), and poly(2-normal propyl-2-oxazoline); polyvinyl alkyl ether such as polyvinyl methyl ether and polyvinyl ethyl ether; a copolymer of polyethylene oxide and polypropylene oxide; poly(oxyethylene vinyl ether); cellulose derivative such as methyl cellulose, ethyl cellulose, hydroxypropyl cellulose, and hydroxypropyl methyl cellulose; and copolymer of the above polymers.

The temperature-responsive polymer may be a crosslinked product of any of the above polymers. In a case where the temperature-responsive polymer is a crosslinked product, examples of such a crosslinked product include N-alkyl (meth)acrylamide such as N-isopropyl(meth)acrylamide, N-normal propyl(meth)acrylamide, N-methyl(meth)acrylamide, N-ethyl(meth)acrylamide, N-normal butyl(meth) acrylamide, N-isobutyl(meth)acrylamide, and N-t-butyl (meth)acrylamide; N-vinyl alkylamide such as N-vinyl isopropylamide, N-vinyl normal propylamide, N-vinyl normal butylamide, N-vinyl isobutylamide, and N-vinyl-t-butylamide; vinyl alkyl ether such as vinyl methylether and vinyl ethyl ether; ethylene oxide and propylene oxide; monomer such as 2-alkyl-2-oxazoline such as 2-ethyl-2-oxazoline, 2-isopropyl-2-oxazoline, and 2-normal propyl-2-oxazoline; and polymer produced by polymerizing two or more of the above monomers in the presence of a crosslinking agent.

The above crosslinking agent may be a publicly known crosslinking agent selected as appropriate. Suitable examples of the crosslinking agent include a crosslinking monomer having a polymerizable functional group such as ethylene glycol di(meth)acrylate, propylene glycol di(meth) acrylate, N,N'-methylene bis(meth)acrylamide, tolylene diisocyanate, divinylbenzene, and polyethyleneglycol di(meth) acrylate; glutaraldehyde; polyhydric alcohol; polyhydric amine; polyhydric carboxylic acid; and metal ion such as calcium ions and zinc ions. An embodiment of the present invention may use either only one of the above crosslinking agents or a combination of two or more of the above crosslinking agents.

The temperature-responsive polymer can be mixed with insoluble particles such as particles of carbon or iron oxide. This makes it possible to use a magnetic field as the external stimulus because carbon, iron oxide, or the like generates heat through a variation of magnetic field.

Examples of a stimuli-responsive polymer whose affinity with water changes reversibly in response to light include (i) a polymer whose hydrophilicity or polarity changes due to light such as an azobenzene derivative and a spiropyran derivative, (ii) a copolymer of the above polymer and at least either a temperature-responsive polymer or a pH-responsive polymer, (iii) a crosslinked product of the light-responsive polymer, and (iv) a crosslinked product of the above copolymer.

Examples of a stimuli-responsive polymer whose affinity with water changes reversibly in response to an electric field include (i) a polymer having a dissociable group such as a carboxyl group, a sulfonic group, a phosphate group, and an amino group, (ii) a polymer containing a complex formed by electrostatic interaction or hydrogen bonding, such as a complex of a carboxyl group-containing polymer and an amino group-containing polymer, and (iii) a crosslinked product of these.

Examples of a stimuli-responsive polymer whose affinity with water changes reversibly in response to pH include (i) a polymer having a dissociable group such as a carboxyl group, a sulfonic group a phosphate group, and an amino group, (ii) a polymer containing a complex formed by electrostatic interaction or hydrogen bonding, such as a complex of a carboxyl group-containing polymer and an amino group-containing polymer, and (iii) a crosslinked product of these.

The stimuli-responsive polymer may be a derivative of any of the above stimuli-responsive polymers or a copolymer of a stimuli-responsive polymer and another monomer. Such another monomer is not limited to any particular one, and may be any monomer. Suitable examples include a monomer such as (meth)acrylic acid, allylamine, vinyl acetate, (meth)acrylamide, N,N'-dimethyl(meth)acrylamide, 2-hydroxyethyl methacrylate, alkyl(meth)acrylate, maleic acid, vinyl sulfonic acid, vinyl benzenesulfonic acid, acrylamide alkyl sulfonic acid, dimethylaminopropyl(meth)acrylamide, and (meth)acrylonitrile.

The stimuli-responsive polymer may alternatively be a polymer that has formed an interpenetrating polymer network structure or semi-interpenetrating polymer network structure together with another crosslinked or non-crosslinked polymer.

The molecular weight of the stimuli-responsive polymer is also not limited to any particular value. However, the number-average molecular weight determined by gel permeation chromatography (GPC) is preferably not less than 3000.

The method for producing the stimuli-responsive polymer is also not limited to any particular one, and may be any publicly known method selected as appropriate. The method for producing a porous stimuli-responsive polymer is also not limited to any particular one. A porous stimuli-responsive polymer can be produced by, for example, drying the stimuli-responsive polymer by freeze-drying, vacuum-drying, or the like.

Note that moisture in air (water vapor) being adsorbed and absorbed by a dried product of a polymer gel is scholarly referred to as sorption. However, the main focus of the present invention is to cause, by applying an external stimulus to a dried product, the dried product to release moisture that was absorbed into the dried product. Thus, moisture in air being absorbed into a dried product will be hereinafter referred to as moisture absorption whereas liquid water being released in the form of a water droplet as a result of application of an external stimulus will be hereinafter referred to as release of water (moisture).

[Recap]

A dehumidifying device in accordance with a first aspect of the present invention includes (i) a polymeric moisture absorbing material containing a stimuli-responsive polymer whose affinity with water changes reversibly in response to an external stimulus, (ii) a stimulus providing section configured to provide an external stimulus for decreasing the affinity of the polymeric moisture absorbing material with water, and (iii) a transfer section configured to transfer water droplets released by the polymeric moisture absorbing material.

The dehumidifying device in accordance with the first aspect of the present invention includes a disk-shaped moisture absorbing unit including a combination of a plurality of elements each including a substrate, a polymeric moisture absorbing material on the substrate, and a stimulus providing section on the substrate. The dehumidifying device further includes a transfer section in the shape of a flat plate which transfer section is configured to transfer water droplets released by the polymeric moisture absorbing material.

The above configuration advantageously makes it possible to efficiently collect water released by the polymeric moisture absorbing material.

A dehumidifying device in accordance with a second aspect of the present invention includes, in addition to the configuration of the first aspect, a contact type water droplet removing section configured to rapidly remove water droplets transferred on the transfer section.

The above configuration serves to remove water droplets from the transfer section, onto which water released by the polymeric moisture absorbing material has been transferred, and thus advantageously makes it possible to collect such water efficiently.

A dehumidifying device in accordance with a third aspect of the present invention includes, in addition to the configuration of the first aspect, a non-contact type water droplet removing section configured to rapidly remove water droplets transferred on the transfer section.

The above configuration serves to remove water droplets from the transfer section, onto which water released by the polymeric moisture absorbing material has been transferred, and thus advantageously makes it possible to collect such water efficiently. Further, the water droplet removing section being in no direct contact with the polymeric moisture absorbing material or transfer section can prevent the polymeric moisture absorbing material and transfer section from wearing out.

A dehumidifying device in accordance with a fourth aspect of the present invention is configured such that the moisture absorbing unit and transfer section, which are each in the shape of a flat plate according to the first to third aspects, are each in the shape of a cylinder.

The above configuration allows release of water droplets by the polymeric moisture absorbing material and removal of the water droplets to be carried out continuously. The above configuration thus advantageously makes it possible to efficiently remove water released by the polymeric moisture absorbing material and collect the water in a water drain tank.

A dehumidifying device in accordance with a fifth aspect of the present invention is configured as in the fourth aspect, and further includes a water droplet removing section configured to come into contact with the cylindrical transfer section.

The above configuration advantageously makes it possible to remove water droplets from the transfer section rapidly and collect the released water efficiently.

A dehumidifying device in accordance with a sixth aspect of the present invention is configured as in the fifth aspect, and is further configured such that a water-absorbing material is provided on the surface of the cylindrical transfer section. This advantageously makes it possible to remove water droplets from the moisture absorbing unit rapidly and collect the released water efficiently.

With the above configuration, the water-absorbing material helps movement of water from the polymeric moisture absorbing material to the transfer section. Since water droplets are transferred onto the transfer section rapidly with the help of the water-absorbing power of the water-absorbing material, the above configuration advantageously makes it possible to collect released water efficiently.

A dehumidifying device in accordance with a seventh aspect of the present invention is configured such that the transfer section of the sixth aspect is replaced with a concentrating section including a polymeric moisture absorbing material.

With the above configuration, water that has exuded from the moisture absorbing unit is absorbed and concentrated by a polymeric moisture absorbing material of the concentrating section, and the concentrating section is then heated for discharge of the water. The above configuration thus advantageously allows efficient heating and efficient water collection.

A dehumidifying method in accordance with an embodiment of the present invention uses a polymeric moisture absorbing material containing a stimuli-responsive polymer whose affinity with water changes reversibly in response to an external stimulus, the dehumidifying method including (i) providing an external stimulus to the polymeric moisture absorbing material, which has been caused to absorb atmospheric water, so as to decrease affinity of the polymeric moisture absorbing material with water and (ii) bringing a transfer section into contact with the polymeric moisture absorbing material, whose affinity with water has been decreased, so that water released by the polymeric moisture absorbing material is transferred onto the transfer section.

The above configuration advantageously makes it possible to efficiently transfer, onto the transfer section, water released by the polymeric moisture absorbing material and collect the water in a water drain tank.

A humidity control device in accordance with an embodiment of the present invention includes the dehumidifying device.

The above configuration advantageously makes it possible to efficiently control humidity without the need for supercooling or large heat quantity.

In order to attain the above object, a dehumidifying device in accordance with an embodiment of the present invention includes (i) a polymeric moisture absorbing material containing a stimuli-responsive polymer whose affinity with water changes reversibly in response to an external stimulus, (ii) a stimulus providing section configured to provide an external stimulus for decreasing the affinity of the polymeric moisture absorbing material with water, and (iii) a transfer section configured to transfer water released by the polymeric moisture absorbing material, whose affinity with water has been decreased.

A dehumidifying device in accordance with an embodiment of the present invention may include a water droplet removing section configured to force water released by the polymeric moisture absorbing material and transferred on the transfer section to come off the transfer section.

A dehumidifying device in accordance with an embodiment of the present invention may include, as a transfer section configured to transfer water released by the polymeric moisture absorbing material, a transfer section including a material that does not absorb water.

A dehumidifying device in accordance with an embodiment of the present invention may include, as a transfer section configured to transfer water released by the polymeric moisture absorbing material, a transfer section including a material that absorbs water.

A dehumidifying device in accordance with an embodiment of the present invention may further include a concentrating section configured to concentrate water released by the polymeric moisture absorbing material, and be configured such that water droplets released by the concentrating section is transferred onto the transfer section to be let drop off.

In order to attain the above object, a dehumidifying method in accordance with an embodiment of the present invention includes (i) providing an external stimulus to a polymeric moisture absorbing material, the polymeric moisture absorbing material containing a stimuli-responsive polymer whose affinity with water changes reversibly in response to an external stimulus and having been caused to absorb atmospheric water, so as to decrease affinity of the polymeric moisture absorbing material with water, (ii) transferring, onto a transfer section, water released by the polymeric moisture absorbing material, whose affinity with water has been decreased, and (iii) discharging the water transferred on the transfer section.

INDUSTRIAL APPLICABILITY

A dehumidifying device and dehumidifying method in accordance with an embodiment of the present invention each allow water released from a polymeric moisture absorbing material containing a stimuli-responsive polymer to be collected efficiently. Those dehumidifying device and dehumidifying method, in a case where they are used in a humidity control device, thus allow efficient dehumidification without the need for supercooling or large heat quantity.

The dehumidifying device and dehumidifying method in accordance with an embodiment of the present invention are therefore particularly useful and suitably usable in a humidity control device.

REFERENCE SIGNS LIST

1 Moisture absorbing unit
2, 18 Polymeric moisture absorbing material
3, 19 Base material
4, 20 Heater (stimulus applying section)
5 Air inlet
6 Inlet air filter
7 Air outlet
8 Air blowing fan
9 Water drain tank
10 Stepping motor
12 Moist air 13 Dry air
14 Drop water
15 Transfer section
16 Water droplet removing section
17 Concentrating section
23 Airflow restriction wall
24 Release region
25 Moisture absorption region
26 Bulk portion of polymeric moisture absorbing material
27 Pore in polymeric moisture absorbing material
28 Water droplet removing section motor
29 Transfer section motor

The invention claimed is:

1. A dehumidifying device, comprising:
a polymeric moisture absorbing material disposed on a disk-shaped base and containing a stimuli-responsive polymer whose affinity for water is changed reversibly so that a property of the stimuli-responsive polymer is changed between being hydrophilic and being hydrophobic by an external stimulus, the disk-shaped base rotates between a moisture absorption region and a water droplet release region;
a stimulus providing section disposed on the disk-shaped base and configured to provide the external stimulus by heat to the polymeric moisture absorbing material so that the property is hydrophobic in the water droplet release region; and
a water droplet receiving section movably configured between a position with which a surface of the polymeric moisture absorbing material comes into contact and receives water droplets on the surface, and a position with which the surface does not come into contact, wherein
in the moisture absorption region, the external stimulus is not provided so that the property is hydrophilic; and
in the water droplet release region, the external stimulus is provided by the stimulus providing section so as to be hydrophobic.

2. The dehumidifying device according to claim 1,
wherein the water droplet receiving section includes a material that does not absorb water.

3. The dehumidifying device according to claim 1,
wherein the water droplet receiving section includes a material that absorbs water.

4. The dehumidifying device according to claim 1, further comprising:
a water droplet removing section configured to come into contact with a surface of the water droplet receiving section and remove the water droplets on the surface of the water droplet receiving section.

5. The dehumidifying device according to claim 1, wherein:
the polymeric moisture absorbing material is disposed on the disk-shaped base for formation of a moisture absorbing unit; and
the water droplet receiving section is positioned so as to face a portion of the moisture absorbing unit to which portion the stimulus providing section provides the external stimulus.

6. The dehumidifying device according to claim 1, wherein:
the polymeric moisture absorbing material is disposed on a side surface of a cylindrical base material for formation of a moisture absorbing unit; and
the water droplet receiving section is in a cylindrical shape and is disposed at such a position as to have a side surface in contact with a portion of the moisture absorbing unit to which portion the stimulus providing section provides the external stimulus.

* * * * *